(12) United States Patent
Ishikawa et al.

(10) Patent No.: US 11,978,345 B2
(45) Date of Patent: May 7, 2024

(54) MOVING OBJECT BEHAVIOR PREDICTION DEVICE

(71) Applicant: HITACHI ASTEMO, LTD., Hitachinaka (JP)

(72) Inventors: Masayoshi Ishikawa, Tokyo (JP); Hideaki Suzuki, Tokyo (JP); Hidehiro Toyoda, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 492 days.

(21) Appl. No.: 17/284,150

(22) PCT Filed: Oct. 11, 2019

(86) PCT No.: PCT/JP2019/040169
§ 371 (c)(1),
(2) Date: Apr. 9, 2021

(87) PCT Pub. No.: WO2020/090419
PCT Pub. Date: May 7, 2020

(65) Prior Publication Data
US 2021/0335131 A1 Oct. 28, 2021

(30) Foreign Application Priority Data
Oct. 29, 2018 (JP) .................................. 2018-202471

(51) Int. Cl.
*G08G 1/16* (2006.01)
*B60W 60/00* (2020.01)
(Continued)

(52) U.S. Cl.
CPC .......... *G08G 1/166* (2013.01); *B60W 60/001* (2020.02); *G06N 3/04* (2013.01); *G06N 3/08* (2013.01);
(Continued)

(58) Field of Classification Search
None
See application file for complete search history.

(56) References Cited

U.S. PATENT DOCUMENTS 10,474,908 B2* 11/2019 Levi ..................... G06F 18/24
11,541,885 B2* 1/2023 Velkey ............ B60W 60/00272
(Continued)

FOREIGN PATENT DOCUMENTS

CN 203666504 U 6/2014
CN 105321375 A 2/2016
(Continued)

OTHER PUBLICATIONS

Chinese Office Action issued on Jun. 30, 2022 for Chinese Patent Application No. 201980065067.4.

*Primary Examiner* — Todd Melton
(74) *Attorney, Agent, or Firm* — Volpe Koenig

(57) ABSTRACT

A moving object behavior prediction device improves prediction accuracy and includes: an input map generation unit that generates a single input map in which a region capable of containing a plurality of the moving objects is divided into a plurality of cells, in which each of the cells stores related information of a static object and related information of the moving object; a movement amount estimation unit that estimates a movement amount as a feature amount of each cell from the input map, using a trained convolutional neural network; a movement amount acquisition unit that acquires a movement amount at a current position of the moving object from a movement amount stored in a peripheral cell the moving object; and a future position prediction unit that predicts a future position of the moving object based on a feature amount at a current position of the moving object.

12 Claims, 22 Drawing Sheets

(51) Int. Cl.
  *G06N 3/04* (2023.01)
  *G06N 3/08* (2023.01)
  *G06T 7/246* (2017.01)
  *G06T 7/73* (2017.01)

(52) U.S. Cl.
  CPC ............... *G06T 7/246* (2017.01); *G06T 7/73* (2017.01); *G06T 2207/20081* (2013.01); *G06T 2207/20084* (2013.01); *G06T 2207/30236* (2013.01)

(56) References Cited

U.S. PATENT DOCUMENTS

| | | |
|---|---|---|
| 2015/0353081 A1 | 12/2015 | Kaminade et al. |
| 2017/0004399 A1 | 1/2017 | Kasahara |
| 2017/0301107 A1 | 10/2017 | Sasaki |
| 2019/0347879 A1 | 11/2019 | Motomura et al. |
| 2019/0370609 A1 | 12/2019 | Akiyama et al. |
| 2020/0005644 A1 | 1/2020 | Ichimaru et al. |

FOREIGN PATENT DOCUMENTS

| | | |
|---|---|---|
| JP | 1095291 A | 4/1998 |
| JP | 2006-168628 A | 6/2006 |
| JP | 2011-002869 A | 1/2011 |
| JP | 2011-204124 A | 10/2011 |
| JP | 2011-248445 A | 12/2011 |
| JP | 2013-004021 A | 1/2013 |
| JP | 2015-161545 A | 9/2015 |
| JP | 2017-016414 A | 1/2017 |
| JP | 2017-211913 A | 11/2017 |
| JP | 2018-055141 A | 4/2018 |
| JP | 2018-135075 A | 8/2018 |
| JP | 2018-156550 A | 10/2018 |
| WO | 2016/092650 A1 | 6/2016 |
| WO | 2018/110605 A1 | 6/2018 |
| WO | 2018/146882 A1 | 8/2018 |

* cited by examiner

MOVING OBJECT BEHAVIOR PREDICTION DEVICE

TECHNICAL FIELD

The present invention relates to a moving object behavior prediction device.

BACKGROUND ART

To realize automatic driving of vehicles, sensing technology that senses surrounding conditions using in-vehicle cameras, etc., recognition technology that recognizes the state of the own vehicle and the surrounding environment based on sensing data, and control technology for controlling a driving speed and a steering angle based on recognition information are being developed. In the recognition technology, a future behavior prediction technology that recognizes features and moving objects around the own vehicle to predict the positions of the moving objects around the own vehicle at a future time is required.

The future behavior of the moving objects, such as pedestrians and vehicles, are affected by not only the past behavior of each moving object, but also various factors such as the interaction between the moving objects and the environment around the moving objects such as traffic conditions. In order to deal with the complex influence of these various factors, a mechanism for predicting future behavior by machine learning is being studied. For example, in PTL 1, a mechanism for predicting the future behavior of each moving object by combining the time-series movement of each moving object and a map data which is the environmental information around each moving object is studied.

CITATION LIST

Patent Literature

PTL 1: JP 2018-55141 A

SUMMARY OF INVENTION

Technical Problem

In general, a moving object takes into account the behavior of other distant moving objects in determining its own behavior. In order to predict the future behavior of each moving object, it is necessary to consider a wide range of environmental information.

However, complicated environment recognition requires a large calculation amount, and if a wide range of environmental information is arithmetically processed for each moving object, the calculation amount will increase explosively and it will be difficult to predict the future behavior of surrounding moving objects in real time. The method described in PTL 1 has a problem that only local environmental information can be arithmetically processed in order to reduce the calculation amount, and the prediction accuracy of the future behavior of each moving object is deteriorated.

The present invention has been made in view of the above circumstances, and an object of the invention is to provide a moving object behavior prediction device capable of improving the prediction accuracy of a future behavior of a moving object while suppressing an increase in the calculation amount.

Solution to Problem

A moving object behavior prediction device of one aspect of the present invention predicts a behavior of a moving object around an own vehicle, and includes: an input map generation unit that generates a single input map in which a region capable of containing a plurality of the moving objects is divided into a plurality of cells, each of the cells storing related information of a static object and related information of the moving object; a feature amount estimation unit that estimates a feature amount of each cell from the input map, using a trained convolutional neural network; a feature amount acquisition unit that acquires a feature amount at a current position of the moving object from a feature amount stored in a cell located around the moving object; and a future position prediction unit that predicts a future position of the moving object based on a feature amount at a current position of the moving object.

Advantageous Effects of Invention

According to the present invention, since the related information of the static object of a single input map and the related information of the moving object are commonly used for the behavior prediction of all moving objects, the increase in calculation amount as the number of moving objects to be predicted increases can be suppressed. Further, since the future behavior of each moving object can be predicted by using the information of a wide range map that can include a plurality of moving objects, the prediction accuracy can be improved. Other features of the invention will be clear from the description and the accompanying drawings. In addition, objects, configurations, and effects besides the above description will be apparent through the explanation on the following embodiments.

DESCRIPTION OF EMBODIMENTS

Hereinafter, embodiments of the present invention will be described using the drawings.

First Embodiment

Figure 1:
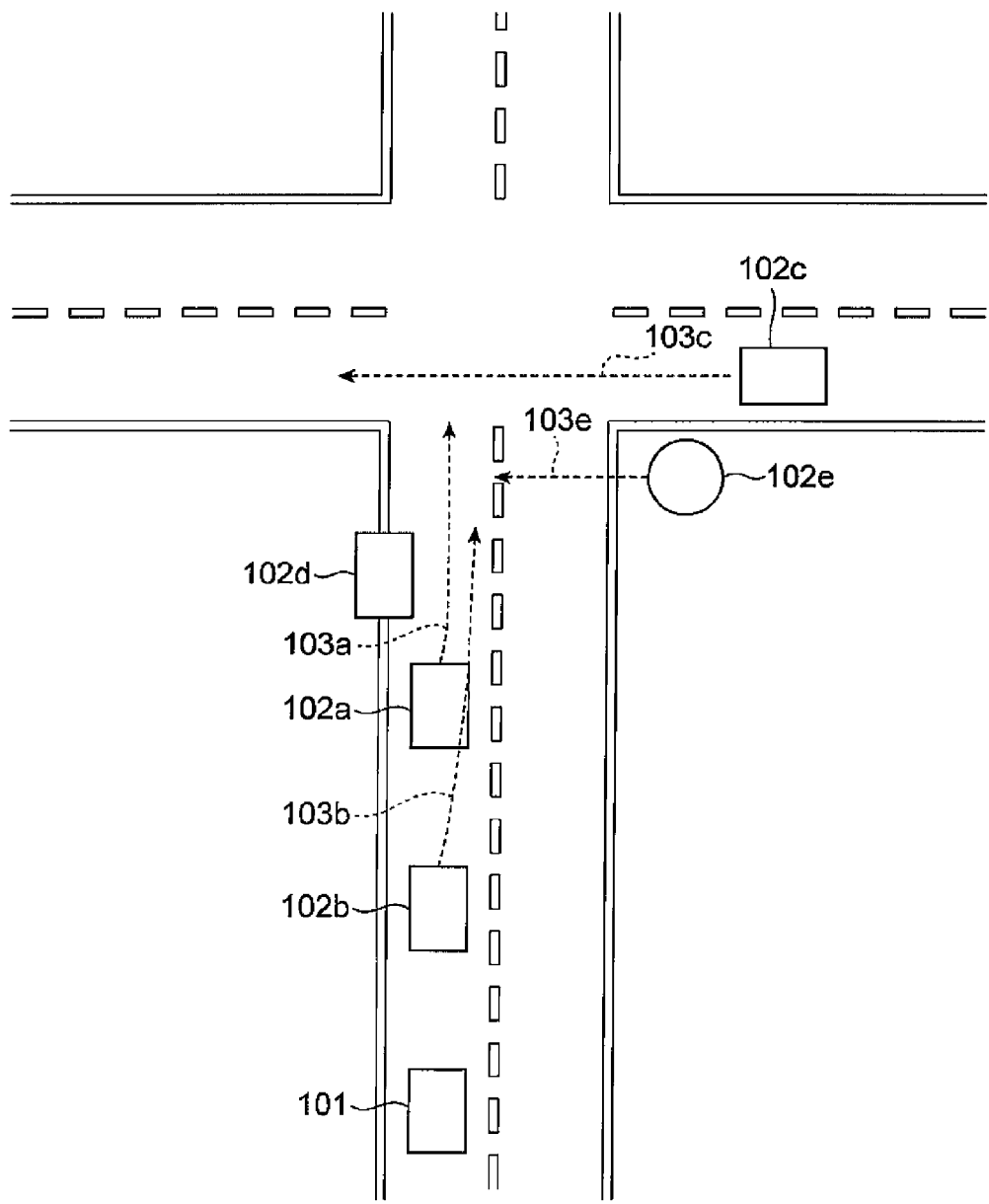
FIG. 1 is a diagram illustrating a prediction example of a future behavior of a moving object.

FIG. 1 is a diagram illustrating a prediction example of a future behavior of a moving object. In the example illustrated in FIG. 1, an own vehicle 101 predicts future behaviors 103a to 103c, and 103e of surrounding moving vehicles 102a to 102d and a pedestrian 102e, which are moving objects, for safety control of the own vehicle 101. Here, the future behavior is information about the future position of another moving object at a predetermined future time.

The own vehicle 101 generates a own vehicle track so as to avoid the future behaviors of other moving objects by predicting the future behaviors, or provides warnings and driving assistance to drivers when there is a risk that the future behaviors of the other moving objects and the own vehicle track of the own vehicle 101 overlap at the future time.

Figure 2:
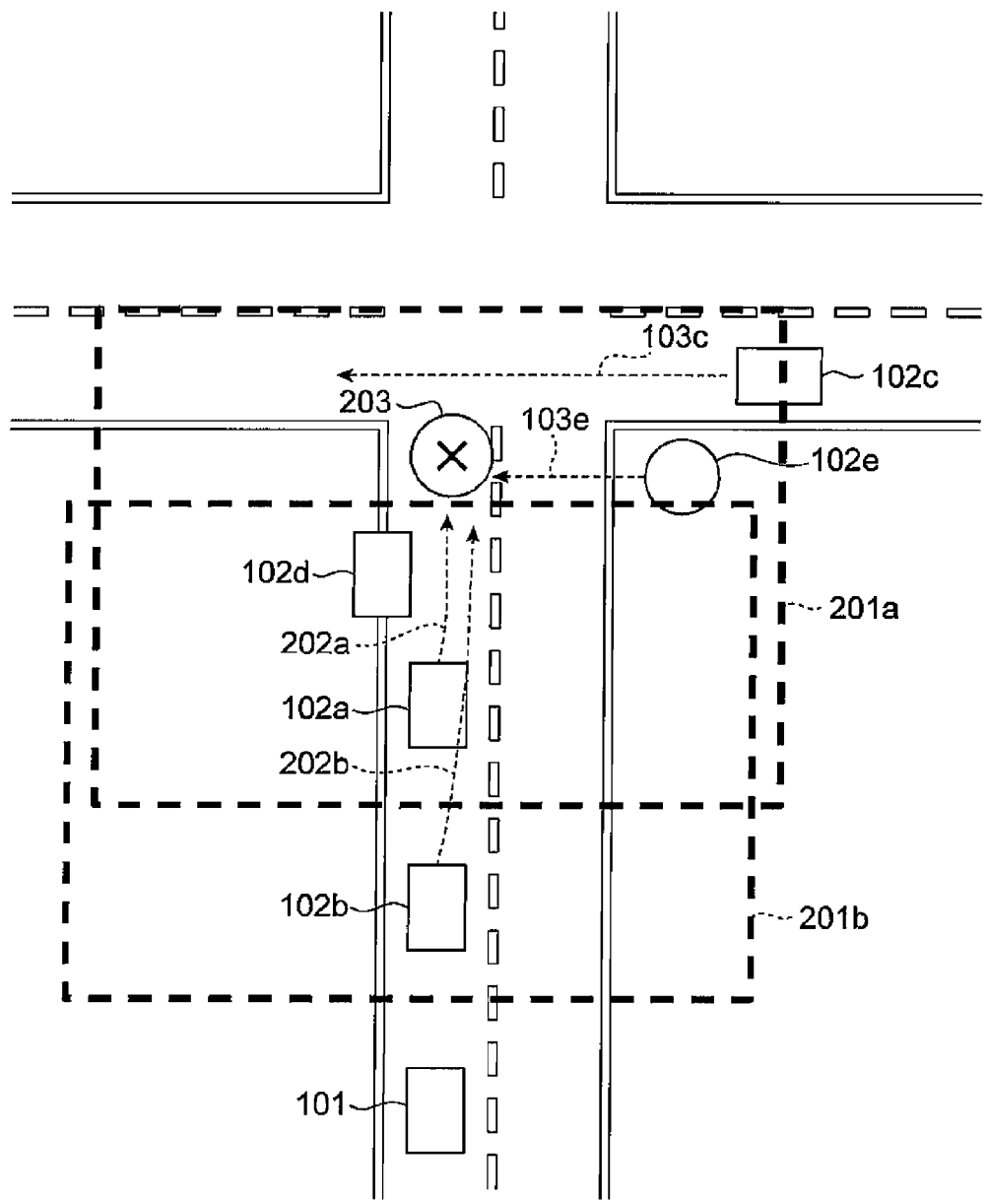
FIG. 2 is a diagram illustrating a prediction example of the future behavior of the moving object by a conventional method.

FIG. 2 is a diagram illustrating a prediction example of the future behavior of the moving object by the conventional method. In the conventional method, when predicting the future behavior of each moving object, information on the peripheral region of each moving object is arithmetically processed. This makes it possible to predict the future behavior of other moving objects in consideration of obstacles existing around each moving object, interaction with other moving objects, and topographical information such as road shape. If the information in a wide processing region can be arithmetically processed, the prediction accuracy will be improved. However, in reality, when trying to arithmetically process the information in a wide processing region, the calculation load is heavy, so only the information in a narrow peripheral region of each moving object is arithmetically processed.

For example, when predicting the future behavior of a vehicle 102b, information on a distant intersection or a pedestrian 102e cannot be considered as illustrated in a processing region 201b. Therefore, for the vehicle 102b, only the straight road, the preceding vehicle 102a, and the parked vehicle 102d can be considered, and a future behavior 202b that maintains the current speed of the vehicle 102b is predicted. On the other hand, for a vehicle 102a, as illustrated in a processing region 201a, the information of the intersection and the influence of the pedestrian 102e and a vehicle 102c are taken into consideration, and the future behavior 202a of stopping before the intersection is predicted. As a result, an unreasonable behavior that the future behavior 202a and the future behavior 202b intersect at the point 203 is predicted, and the prediction accuracy is lowered. Further, since the processing regions 201a and 201b of the vehicles 102a and 102b overlap each other, the arithmetic processing for the information in the overlapping region is wasted.

Figure 3:
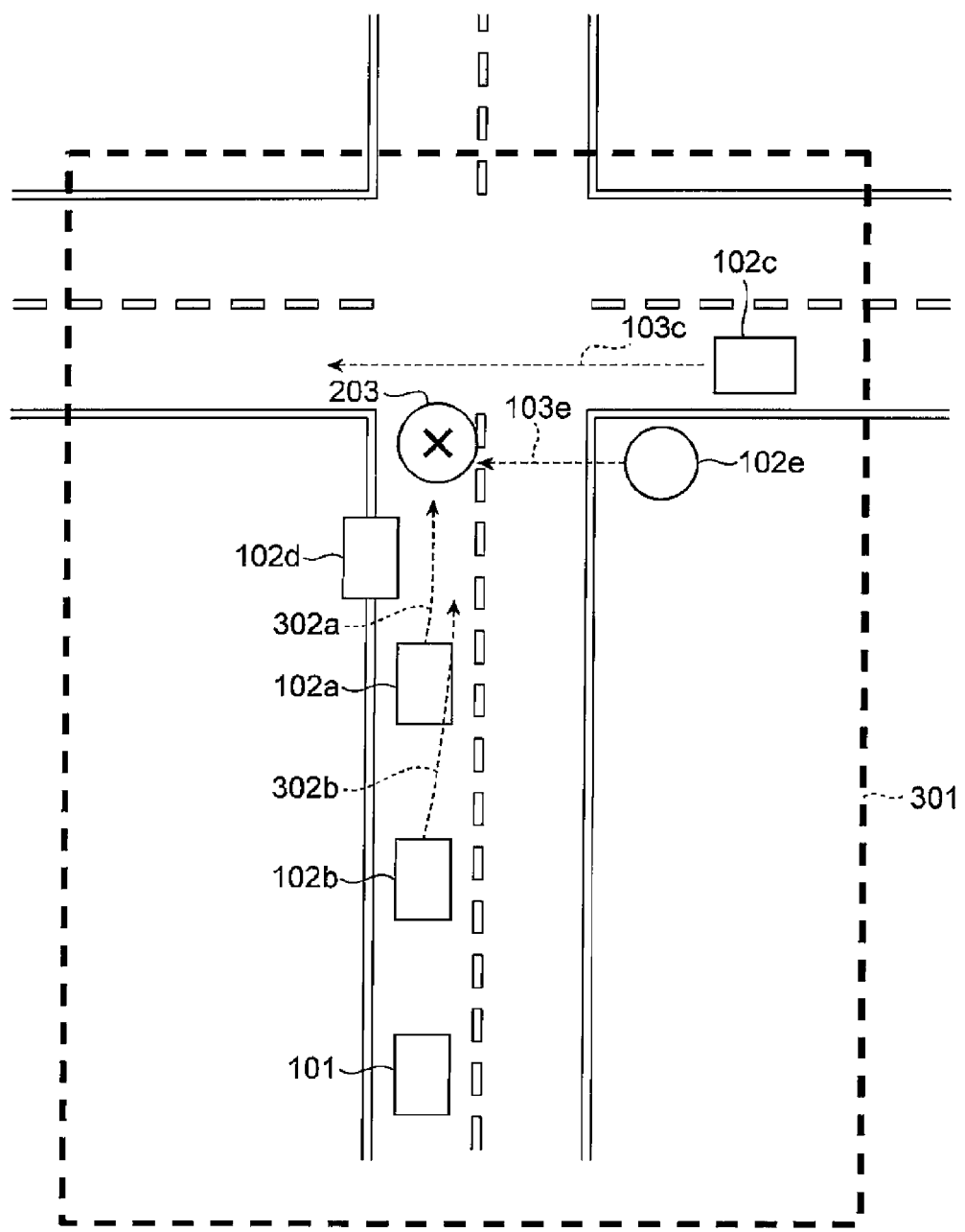
FIG. 3 is a diagram illustrating a prediction example of the future behavior of the moving object according to a first embodiment.

FIG. 3 is a diagram illustrating a prediction example of the future behavior of the moving object according to the first embodiment. In this embodiment, instead of arithmetically processing the information of the peripheral region for each moving object, the information of a wide processing region 301 including a plurality of moving objects is arithmetically processed in a collective manner. The calculation amount is suppressed by arithmetic processing the information in the processing region 301 common to both the vehicles 102a and 102b in a collective manner, and the future behavior of the vehicles 102a and 102b is predicted in consideration of the information in a distance. Similar to the future behavior 202a (see FIG. 2), the vehicle 102a is predicted to have a future behavior 302a that the vehicle 102a stops before the intersection, and the vehicle 102b is predicted to have a future behavior 302b that the vehicle 102b stops behind the vehicle 102a. Therefore, the prediction accuracy is improved without predicting a waste behavior that the future behaviors of the vehicles 102a and 102b intersect at the point 203.

Figure 4:
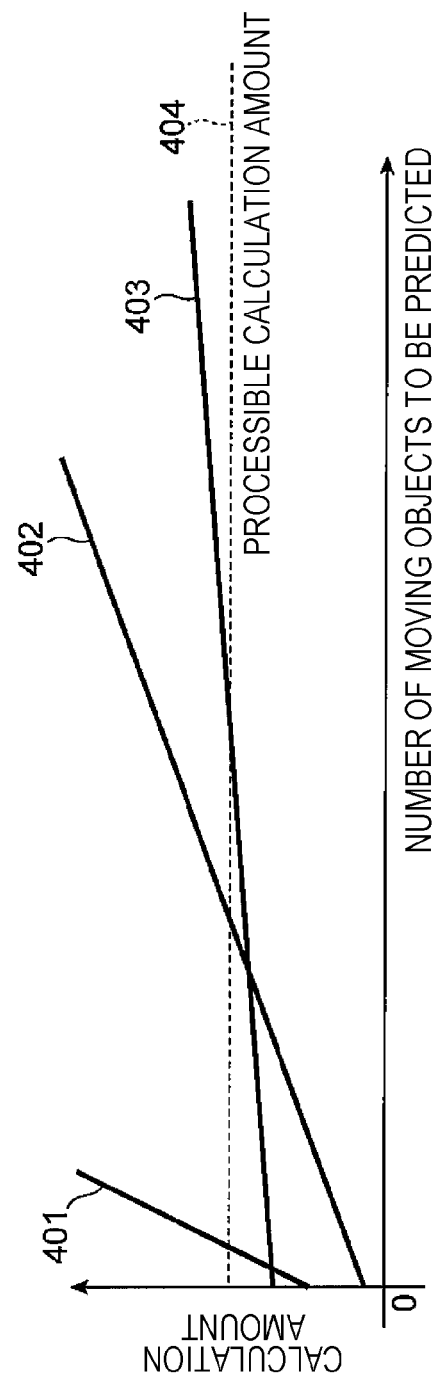
FIG. 4 is a graph illustrating the relationship between the number of moving objects to be predicted and a calculation amount.

FIG. 4 is a graph illustrating the relationship between the number of moving objects to be predicted and the calculation amount. In FIG. 4, the horizontal axis represents the number of moving objects to be predicted, and the vertical axis represents the calculation amount required for predicting future behavior. As illustrated by the calculation amount 401, when the information in a wide region is arithmetically processed by the conventional method, the calculation load increases rapidly, and a calculation amount 404 that the vehicle can process in real time predicts only the future behavior of a small number of moving objects. Therefore, in reality, as illustrated by a calculation amount 402, only the information in the narrow peripheral region is arithmetically processed. By calculating only the information in the peripheral region, the increase ratio of the calculation amount to the increase in the number of moving objects can be suppressed. However, since the information in a distance is not taken into consideration, the prediction accuracy of the future behavior is lowered.

On the other hand, as illustrated by the calculation amount 403, when the information of a wide processing region is collectively processed by the processing method of this embodiment, the calculation amount becomes larger than that of the conventional method when predicting the future behavior of a small number of moving objects. However, compared to the conventional method, even if the behaviors of a large number of moving objects are predicted, the increase in the calculation amount is suppressed, and the prediction accuracy of the future behavior is improved by arithmetically processing the information in a wide processing region. Further, despite the arithmetic processing of a single processing region, the calculation amount increases according to the number of moving objects, which requires arithmetic processing for each moving object in addition to the peripheral region to be collectively processed by all moving objects.

Figure 5:
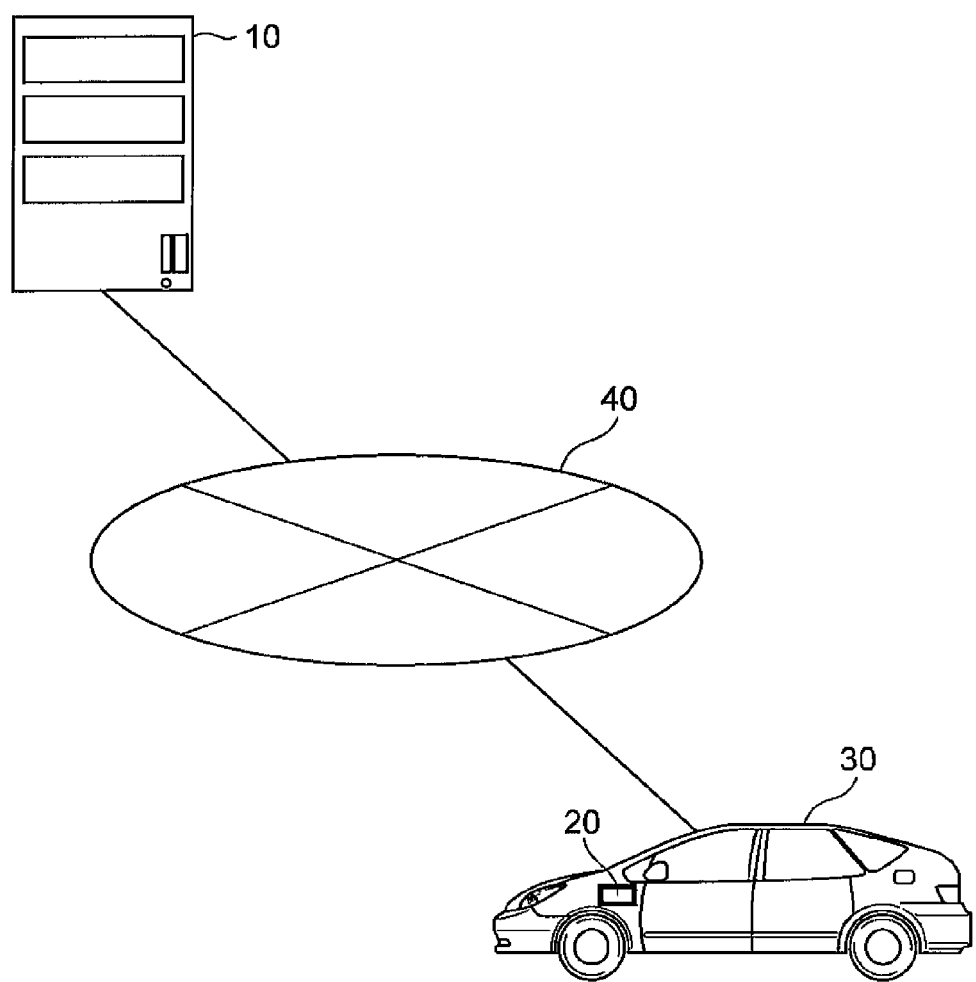
FIG. 5 is a system configuration diagram of a moving object behavior prediction system according to the first embodiment.

Hereinafter, the moving object behavior prediction device of this embodiment will be described. FIG. 5 is a system configuration diagram of the moving object behavior prediction system according to the first embodiment. In the moving object behavior prediction system, an external server 10 and a vehicle 30 equipped with a moving object behavior prediction device 20 are connected via a network 40. The server 10 is installed in a data center or the like, manages various data collected from the vehicle 30, and learns a future behavior from various data by a convolutional neural network. The vehicle 30 is periodically notified of the parameters of the convolutional neural network from the server 10. The moving object behavior prediction device 20 of the vehicle 30 constructs a convolutional neural network trained by the parameters notified from the server 10 to predict the future behavior of the surrounding moving objects.

Figure 6:
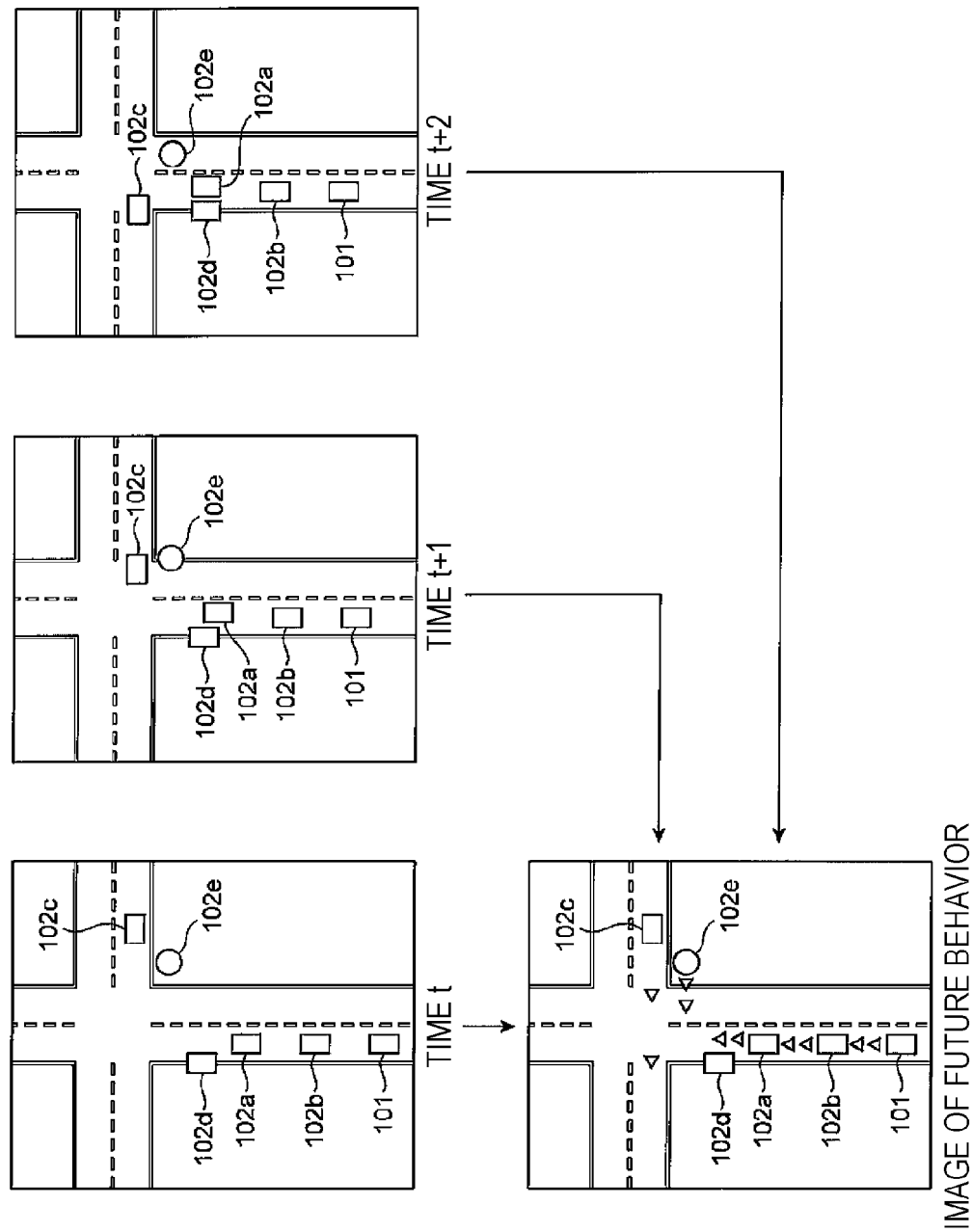
FIG. 6 is a diagram illustrating a learning image of the first embodiment.

FIG. 6 is a diagram illustrating a learning image of the first embodiment. Each moving object is the same as the vehicles 102a to 102d and the pedestrian 102e illustrated in FIG. 1. In the image of the future behavior, the positions of each moving object at times t+1 and t+2 are illustrated, as the future behavior, in a triangle. In the future behavior prediction process of this embodiment, the future behavior of each moving object observed at time t is predicted. At this time, the positions of the own vehicle and moving objects at times t+1 and t+2 are learned as training data, and the future behavior of each moving object at times t+1 and t+2 is predicted from the information at time t. Although only the future behaviors at two different times are predicted here, the future behaviors at two or more times may be predicted.

Figure 7:
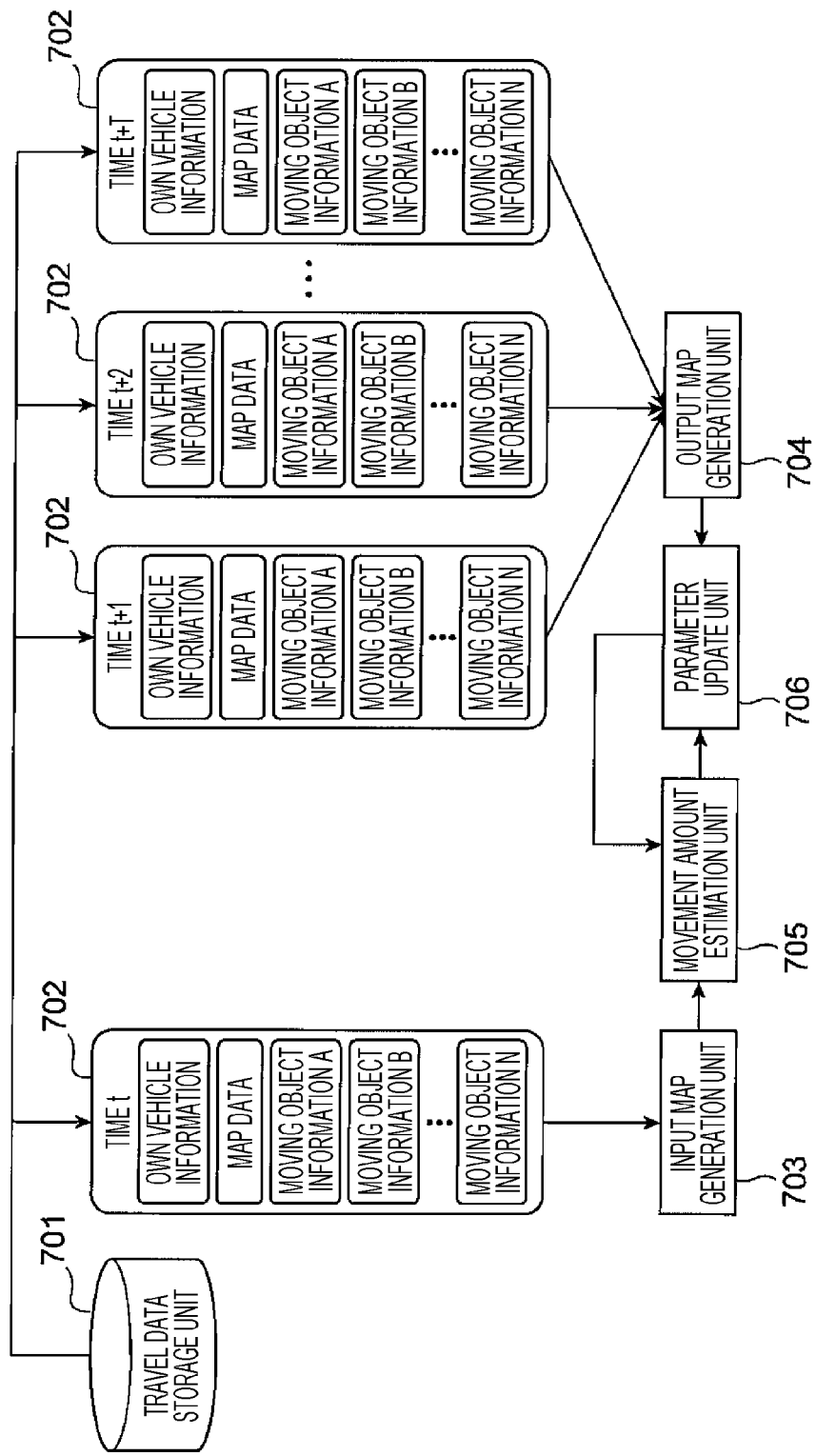
FIG. 7 is a functional block diagram of a server of the first embodiment.

FIG. 7 is a functional block diagram of the server of the first embodiment. The server is provided with a traveling data storage unit 701, an input map generation unit 703, an output map generation unit 704, a movement amount estimation unit 705, and a parameter update unit 706. The traveling data storage unit 701 stores traveling data 702 at each time collected from each moving object. The traveling data 702 at each time includes own vehicle information, map data, and moving object information. The own vehicle information is information on the position, posture, speed, etc. at each time, and is, for example, GPS information, speed information in the xy direction, yaw rate information, and azimuth angle information. The map data is topographical data around the own vehicle, and is composed of data such as road shapes, buildings, intersections, pedestrian crossings, and signs. The moving object information is information about a moving object to be predicted, for example, an ID, a posture, a speed, a relative position from the own vehicle, and a movement amount from a past time. The moving object information can be tracked in the time axis direction by the ID.

Figure 8:
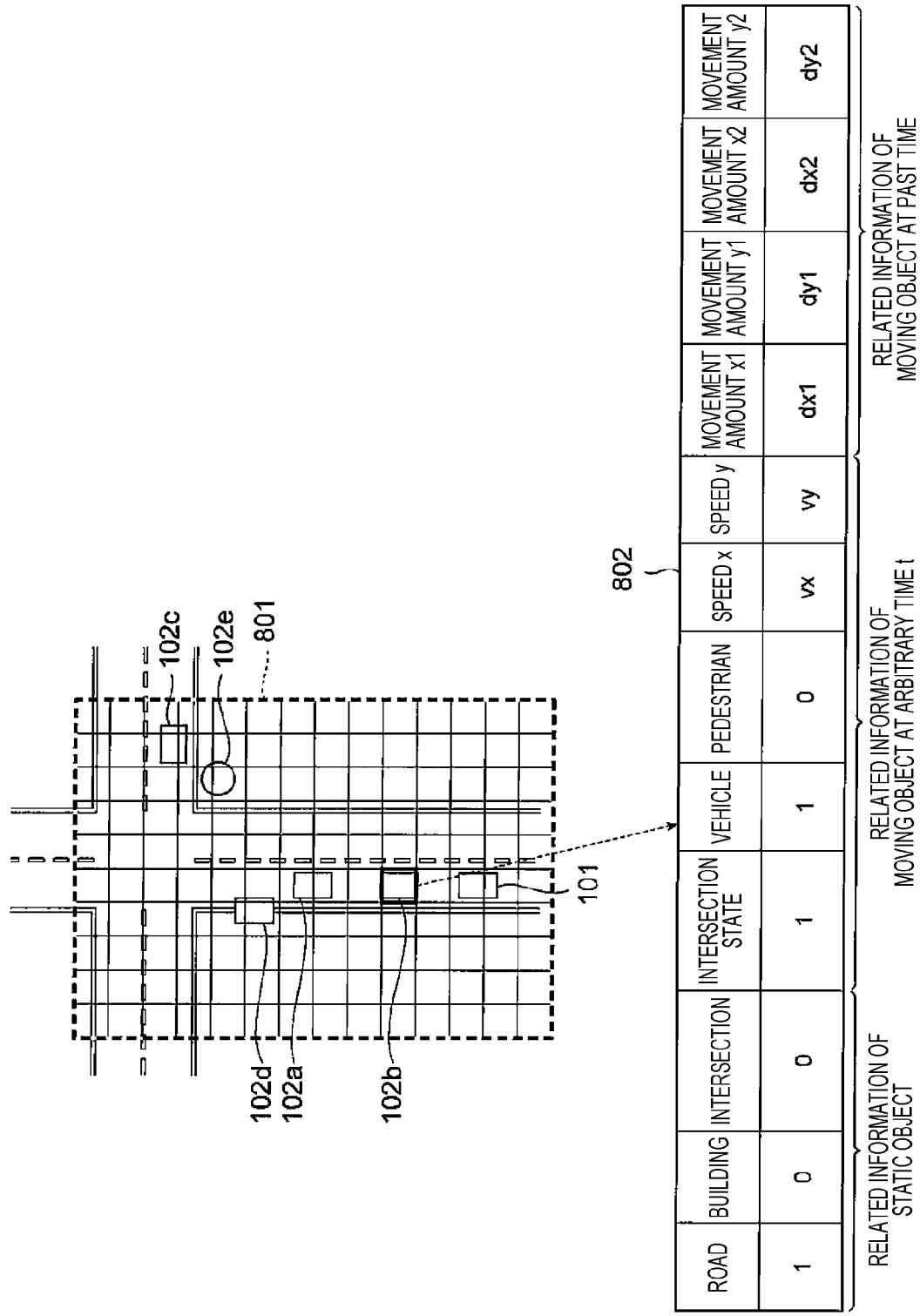
FIG. 8 is a diagram illustrating an example of an input map of the first embodiment.

The input map generation unit 703 reads the traveling data 702 at an arbitrary time t from the traveling data storage unit 701 and generates a single input map 801. As illustrated in FIG. 8, the input map 801 is a grid map in which a region capable of containing a plurality of moving objects is divided into a plurality of cells.

The input map 801 is set based on the own vehicle 101. Various factors such as the surrounding environment of each moving object, the interaction between the moving objects, and the past behavior of each moving object influence the prediction of the future behavior. In order to consider these various factors, each cell of the input map 801 stores data 802 containing the related information of a static object, the related information of the moving object at the arbitrary time t, and the related information of the moving object in the past time before the arbitrary time t.

The related information of the static object is information on fixed features such as roads, buildings, and intersections. Although omitted in FIG. 8, information such as pedestrian crossings, white lines, and signs may be included as the related information of the static object. In the data 802, "1" is set for the item of the static object included in each cell, and "0" is set for the item of the static object not included in each cell. The related information of the static object is generated by the map data of the traveling data 702 (see FIG. 7) at an arbitrary time t.

The related information of the moving object at an arbitrary time t is time-variant information such as intersection state, vehicle, pedestrian, and speed information of the moving object. As for the intersection state, "1" is set in the data 802 when the vehicle may enter the intersection region from the advancing direction of the own vehicle, and "0" is set in the data 802 when the vehicle must not enter the intersection region from the advancing direction of the own vehicle. If each cell belongs to the non-intersection region, "1" is set in the data 802. In the data 802, "1" is set in the item of the moving object included in each cell, and "0" is set in the item of the moving object not included in each cell. If there is a moving object in the cell, the speed information vx and vy are set in the data 802. Meanwhile, if there is no moving object in the cell, 0 is set in the data 802. The information of the moving object at the arbitrary time t is generated by the moving object information of the traveling data 702 (see FIG. 7) at the arbitrary time t.

The related information of the moving object at the past time is the movement amount from the position where the moving object existing in each cell exists at the past time before the arbitrary time t to the position where it exists at the arbitrary time t. For example, in the data 802, the movement amounts dx1, dy1, dx2, and dy2 in the xy direction from the times t−1 and t−2 of the vehicle 102b to the arbitrary time t are set. In FIG. 8, although the data 802 includes the movement amounts set for two different times, the movement amount(s) may be set for only one time or for three or more times. Further, in the data 802, the speed information may be set for each time in addition to the movement amount. The information of the moving object at the past time is generated by the moving object information of the traveling data 702 (see FIG. 7) at the arbitrary time t. In this way, the input map 801 is a three-dimensional tensor in which various vector information of static object and moving object illustrated in the data 802 is stored in each cell.

Figure 9:
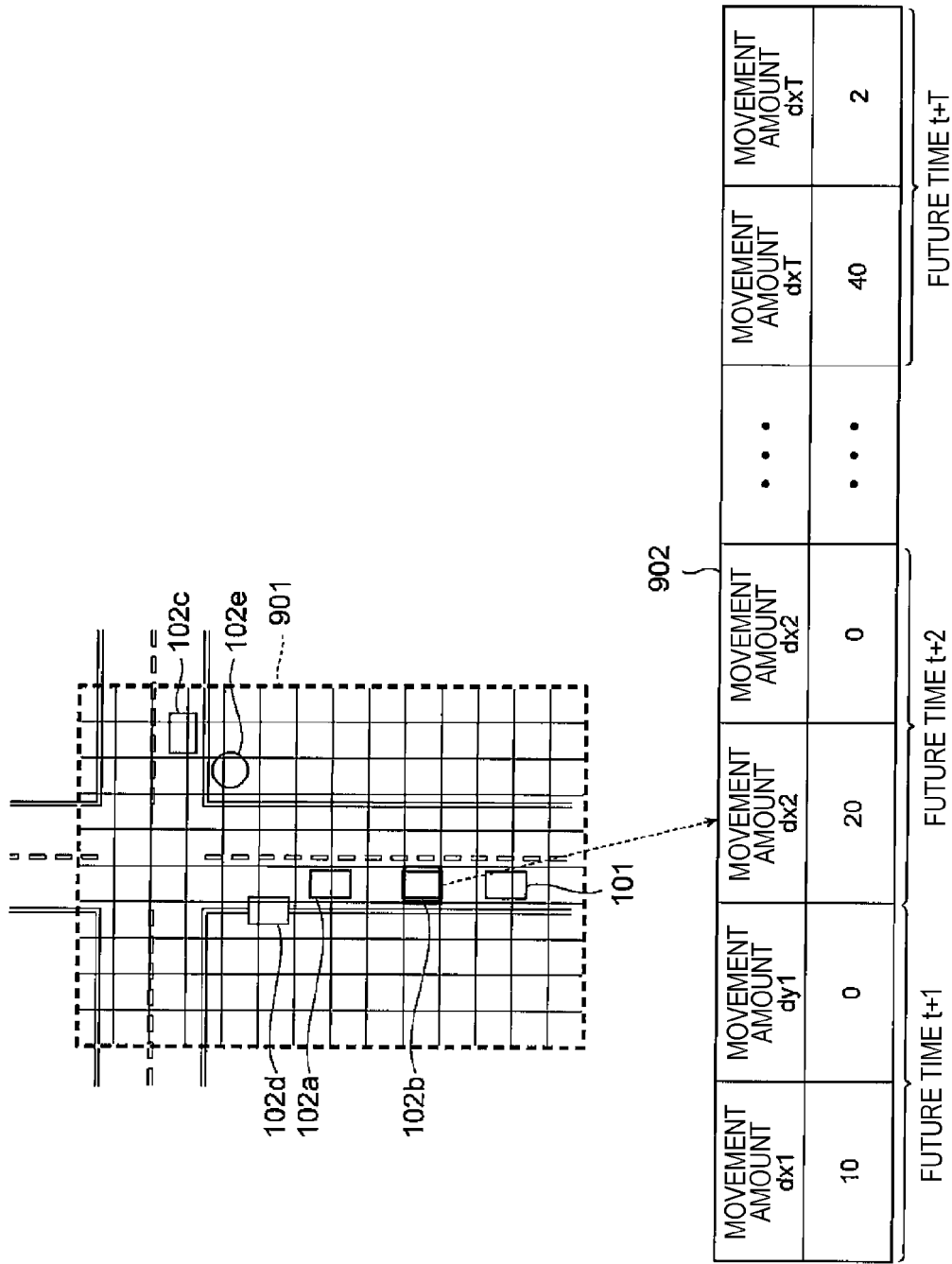
FIG. 9 is a diagram illustrating an example of an output map of the first embodiment.

The output map generation unit 704 reads the traveling data 702 from the future time t+1 to the future time t+T after the arbitrary time t from the traveling data storage unit 701 to generate an output map. As illustrated in FIG. 9, an output map 901 is a grid map having the same resolution in the same range as the input map 801. In each cell of the output map 901, the movement amount from the position of the moving object existing in each cell at an arbitrary time t to the position existing at a future time is stored as data 902. For example, in each cell, as the data 902, the movement amounts dx1, dy1, . . . , dxT, and dyT in the xy direction from the arbitrary time t of the vehicle 102b to the future time t+1, . . . , t+T are stored. The movement amount is not stored for cells that do not have a moving object, and empty vector information is stored. In this way, the output map 901 becomes a three-dimensional tensor in which the vector information of the movement amount indicated by the data 902 is stored in each cell.

The movement amount estimation unit 705 estimates the movement amount of each cell coordinate on the input map 801 by using the input map 801 generated by the input map generation unit 703. The movement amount estimated by the movement amount estimation unit 705 becomes a three-dimensional tensor having the same dimension as the output map 901. The estimating of the movement amount is performed by a convolutional neural network. The convolutional neural network is a neural network that predicts with high accuracy by superimposing a plurality of convolutional layers, and uses, for example, a configuration called U-Net. Further, the convolutional neural network may be a neural network having a structure called an attention mechanism in addition to the convolutional layer.

The parameter update unit 706 updates the parameters used in the convolutional neural network such that an error between the movement amount estimated by the movement amount estimation unit 705 and the movement amount of the output map 901 generated by the output The map generation unit 704 becomes small. The parameters are, for example, a load matrix and a bias term used in a convolutional layer and an attention mechanism. The updating of the parameters is carried out, for example, by a stochastic gradient descent effect method or the extension of the stochastic gradient descent effect method. The calculation of the movement amount error is performed only for the region where the movement amount is stored as the data 902 in the output map 901. In this way, the server uses, as a target output, the movement amount of the moving object, which has been observed at an arbitrary time, until the future time, and updates the parameter of the convolutional neural network such that the error between the movement amount of the future time estimated by the convolutional neural network from the input map 801 and the target output becomes small.

Further, since the movement amount estimation unit 705 estimates the movement amount from the input map 801 using the convolutional neural network, the movement amount is estimated by the same three-dimensional tensor as the output map 901. At this time, the region corresponding to the output map 901 changes depending on the position of the own vehicle.

That is, since the position of the input map 801 changes according to the position of the own vehicle amount, the input map 801 and the output map 901 are misaligned. Therefore, if the future behavior of the moving object is directly predicted by the convolutional neural network, the estimation result is affected by the relative position between the own vehicle and the moving object. Since it is not the relative position between each moving object and the own vehicle that affects the future behavior of each moving object, but the surrounding environment of each moving object and the interaction between the moving objects, the learning becomes unstable by immediately predicting the future behavior of each moving object. Therefore, in this embodiment, the influence of the relative position of each moving object with respect to the own vehicle is eliminated by predicting the movement amount with respect to the future time from each cell coordinate without immediately predicting the future behavior of each moving object, so that the learning is stabilized.

When the learning is completed on the server, the server notifies the moving object behavior prediction device of the vehicle of the learning result. The moving object behavior prediction device can estimate the movement amount of the moving object on the vehicle by reflecting the learning result in the estimation of the movement amount. Normally, although the estimation process of the movement amount is learned by the server having abundant computational resources, the estimation process of the movement amount may be learned by the vehicle.

Figure 10:
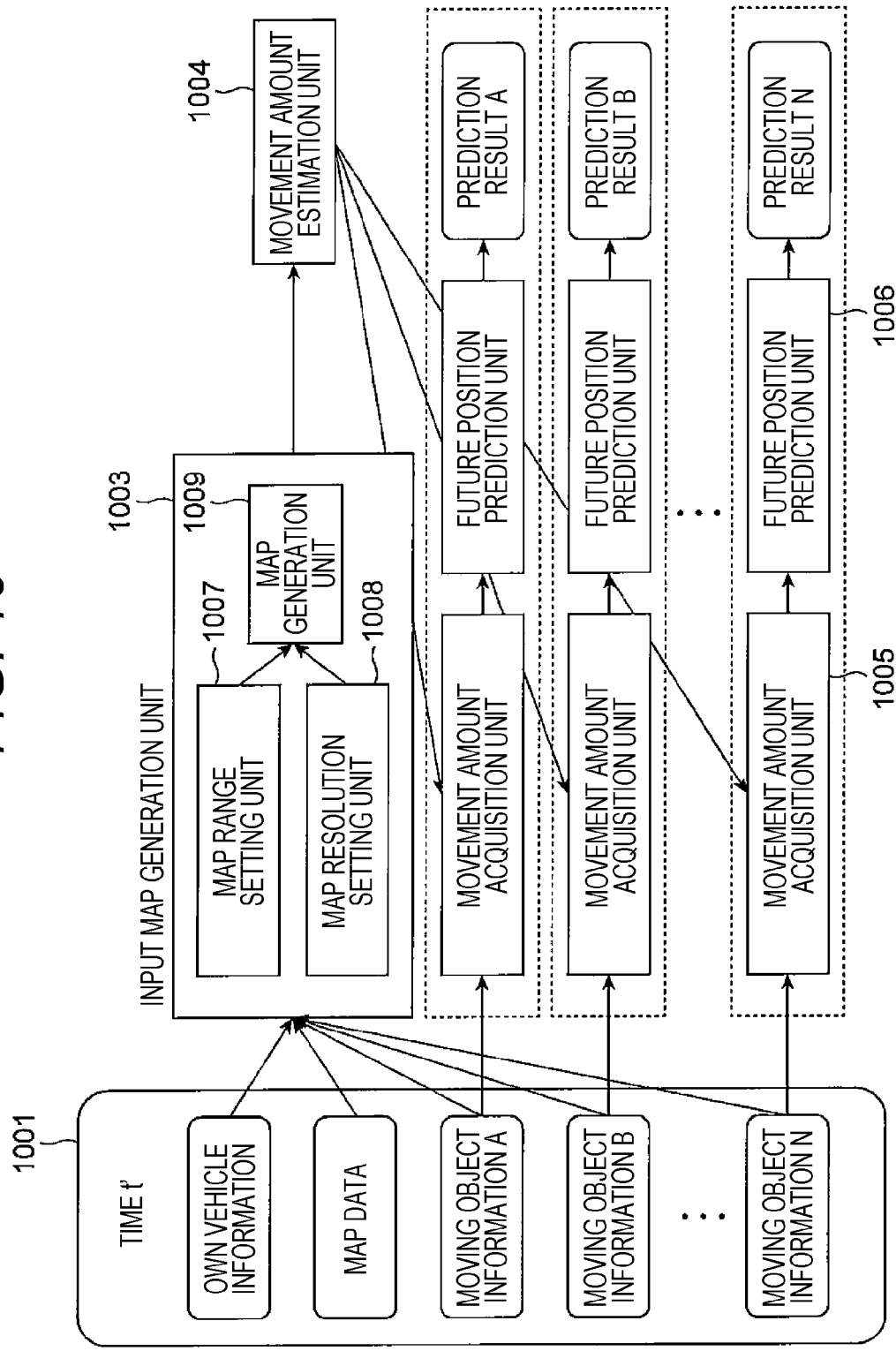
FIG. 10 is a functional block diagram of a moving object behavior prediction device of the first embodiment.

FIG. 10 is a functional block diagram of the moving object behavior prediction device of the first embodiment. The moving object behavior prediction device is provided with an input map generation unit 1003, a movement amount estimation unit (feature amount estimation unit) 1004, a movement amount acquisition unit (feature amount acquisition unit) 1005 for each moving object, and a future position prediction unit 1006. The input map generation unit 1003 is provided with a map range setting unit 1007, a map resolution setting unit 1008, and a map generation unit 1009. Further, traveling data 1001 at time t' (current time) is input to the moving object behavior prediction device from various sensors provided in the vehicle, an in-vehicle camera, or the like. The traveling data 1001 includes the own vehicle information, the map data, and the moving object information as well as the traveling data 702 at the time of learning. In the prediction of the future behavior of this embodiment, most of the processing is performed on the map, so the map range and the map resolution affect the prediction accuracy. Therefore, the input map generation unit 1003 dynamically sets the map range by the map range setting unit 1007 and dynamically sets the map resolution by the map resolution setting unit 1008 using the traveling data 1001.

Figure 11:
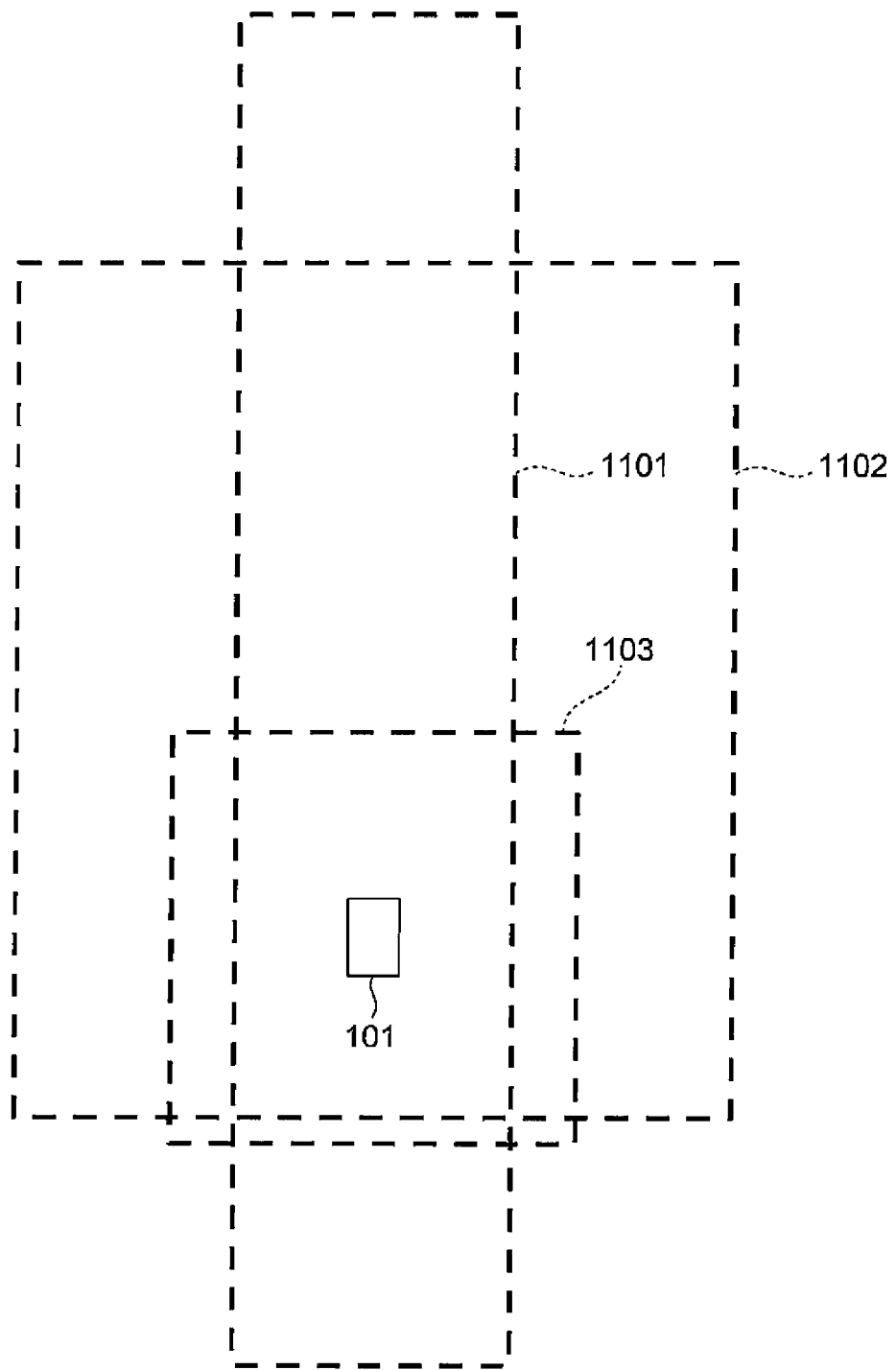
FIG. 11 is an explanatory diagram of a map range setting process according to the first embodiment.

FIG. 11 is an explanatory diagram of the map range setting process according to the first embodiment. The map range setting unit 1007 dynamically sets the map range of the input map according to the type of road on which the own vehicle travels. For example, when the own vehicle is traveling on a highway, the moving objects gather in the front-rear direction rather than the left-right direction, so that a vertically long map range 1101 is set for the own vehicle. When the own vehicle is traveling on a general road, a wide map range 1102 is set for the own vehicle in order to consider vehicles and pedestrians entering the course of the own vehicle from the side. The front-rear direction of the map range 1102 is set narrower than the map range 1101. This is because the speed of the own vehicle and other moving objects is slower on a general road than on a highway, so even if the processing region is narrow, the prediction accuracy is not affected. When the own vehicle is slowing down in a parking lot or the like, it is not necessary to consider a moving object in a distance, so a map range 1103 around the own vehicle is set for the own vehicle.

Figure 12:
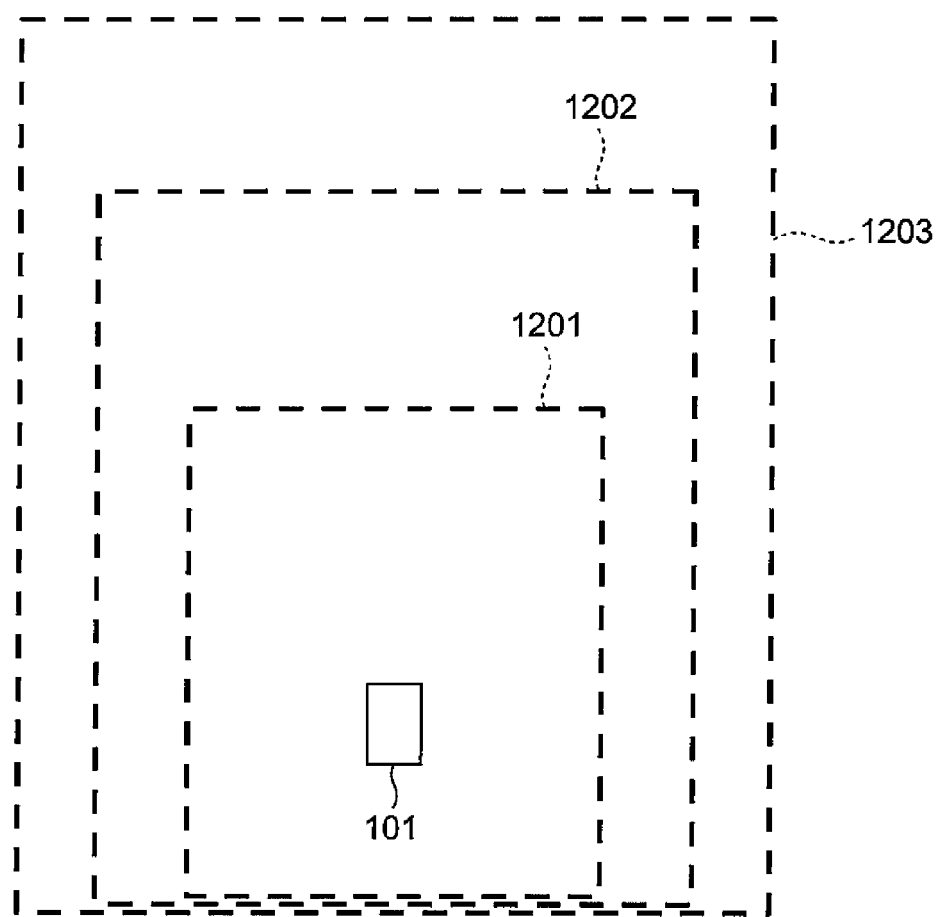
FIG. 12 is another explanatory diagram of the map range setting process according to the first embodiment.

FIG. 12 is another explanatory diagram of the map range setting process according to the first embodiment. The behavior of the own vehicle or moving object is affected by an object in a distance as the speed increases. Therefore, the map range setting unit 1007 sets the map range according to the fastest moving object among the moving objects including the own vehicle.

As the speed of the moving object increases, the range expands, such as the map ranges 1201, 1202, and 1203. In this way, the map range setting unit 1007 sets the shape and size of the map range according to the environment in which the own vehicle travels and the speed of the moving object including the own vehicle. The shape of the map range is prepared in advance for each environment in which the own vehicle travels, and the size of the map range is determined in advance for each speed of the moving object including the own vehicle.

Figure 13:
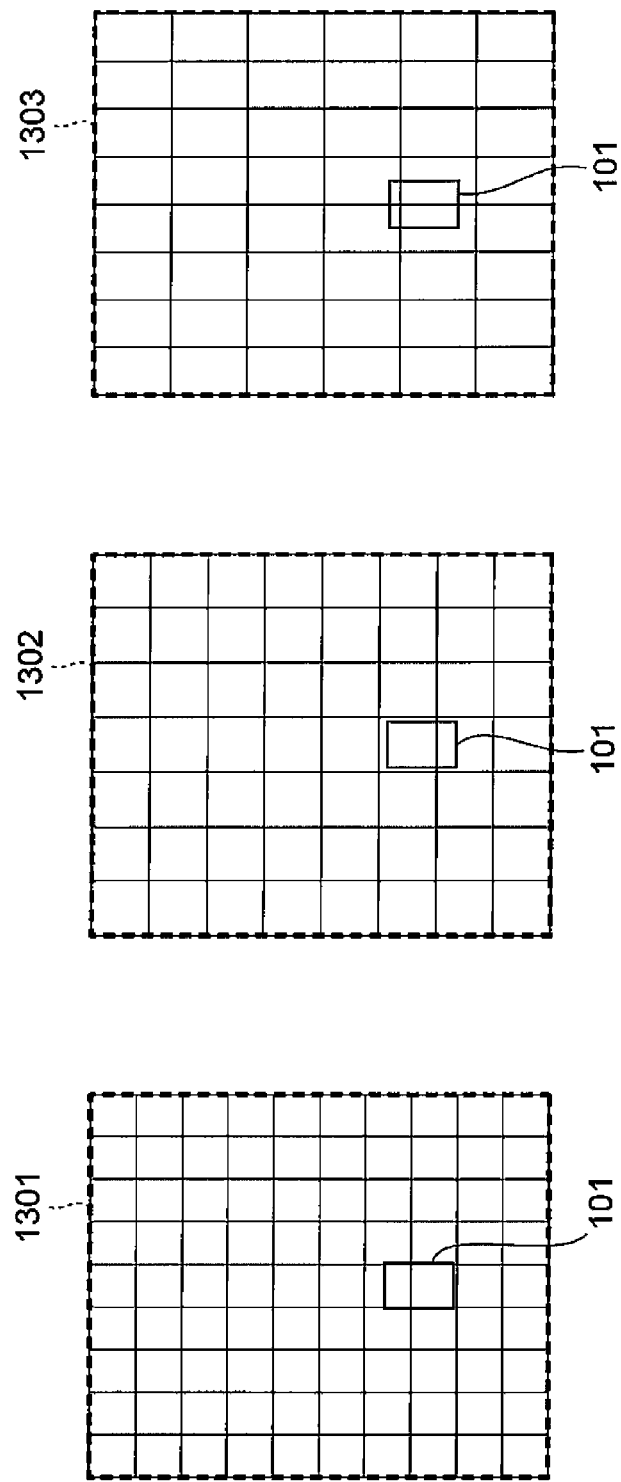
FIG. 13 is an explanatory diagram of a map resolution setting process according to the first embodiment.

FIG. 13 is an explanatory diagram of the map resolution setting process according to the first embodiment. The map resolution setting unit 1008 sets the map resolution according to the number of moving objects per unit area of the input map. When the number of moving objects per unit area of the input map is large and the distance between the moving objects is small, a high resolution is set to the map range such as a map resolution 1301. On the contrary, as the number of moving objects per unit area of the input map decreases and the distance between the moving objects increases, the resolution becomes lower as in the map resolutions 1302 and 1303. As a result, it is possible to prevent information on two or more moving objects from being stored in one cell, and deterioration of prediction accuracy is suppressed. The map range and the map resolution are determined in advance according to the distance between the moving objects.

The processes of the map range setting unit 1007 and the map resolution setting unit 1008 are also used when the input map 801 and the output map 901 are generated during learning by the server.

After setting the map range and the map resolution, the map generation unit 1009 generates an input map using the traveling data 1001 at time t' input from the in-vehicle camera or the like of the vehicle. The input map has the same configuration as the input map 801 illustrated in FIG. 8, and is a grid map divided into a plurality of cells. Each cell of the input map stores data consisting of information on a static object, information on a moving object at time t', and information on the moving object at a past time before time t'.

The movement amount estimation unit 1004 estimates the movement amount as the feature amount of each cell from the input map, using the trained convolutional neural network. The trained convolutional neural network is constructed by reflecting the parameters and the like notified from the server to the moving object behavior prediction device. Here, the movement amount is estimated in a map format as the feature amount of each cell, and the movement amount at a different future time is stored in each cell of the map. At the estimation stage of the movement amount, only the movement amount stored in each cell is estimated, and the movement amount of the moving object is not estimated.

Figure 14:
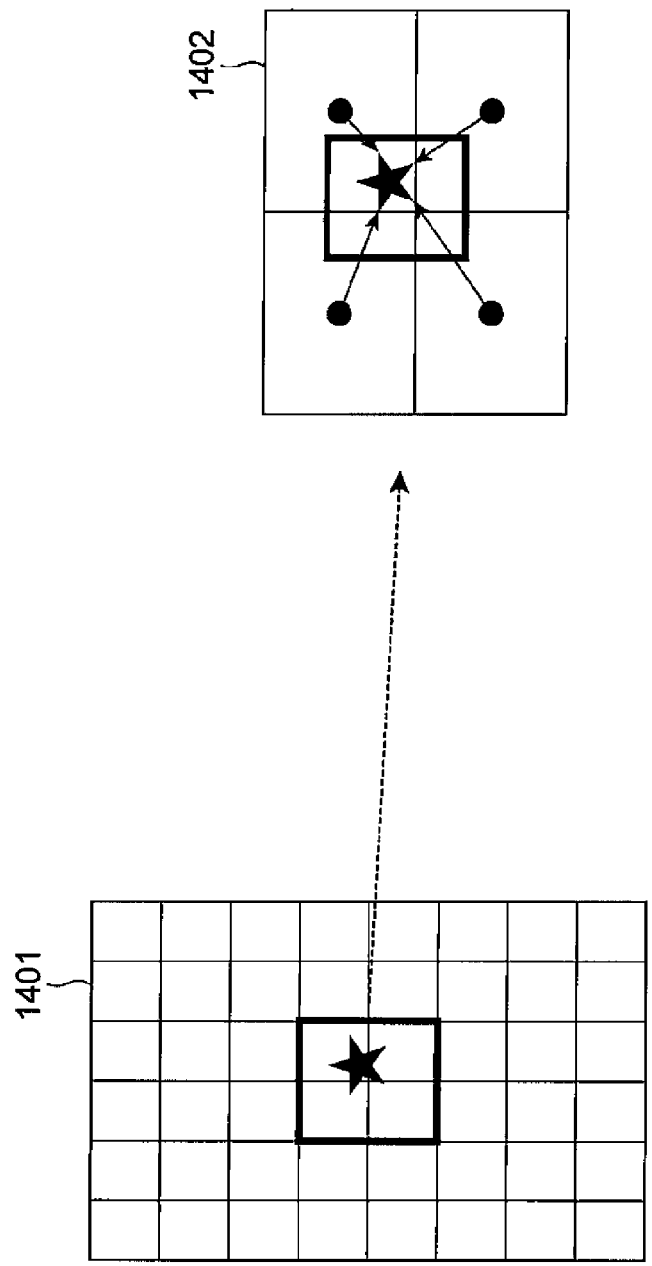
FIG. 14 is an explanatory diagram of a movement amount acquisition process according to the first embodiment.

FIG. 14 is an explanatory diagram of the movement amount acquisition process according to the first embodiment. The movement amount acquisition unit 1005 acquires a movement amount at a different future time from the current position of the moving object based on the movement amount of each cell of the movement amount map 1401 estimated by the movement amount estimation unit 1004. As illustrated by star marks, the moving object rarely exists at the center of each cell coordinate, and is actually located at a coordinate deviated from the center of each cell coordinate on the movement amount map 1401. A movement amount map 1402 is obtained by extracting the periphery of the moving object from the movement amount map 1401, and each cell of the movement amount map 1402 stores the movement amount of the moving object at the future time when it exists at the center of each cell coordinate. The movement amount acquisition unit 1005 acquires the movement amount from the positional relationship between the coordinates on the map on which the moving object exists and the movement amount of the peripheral cells. The movement amount acquisition unit 1005 acquires, for example, the movement amount at the future time at the coordinate of the map in which the moving object exists, by using bilinear interpolation, from the four cells around the moving object for each future time.

Figure 15:
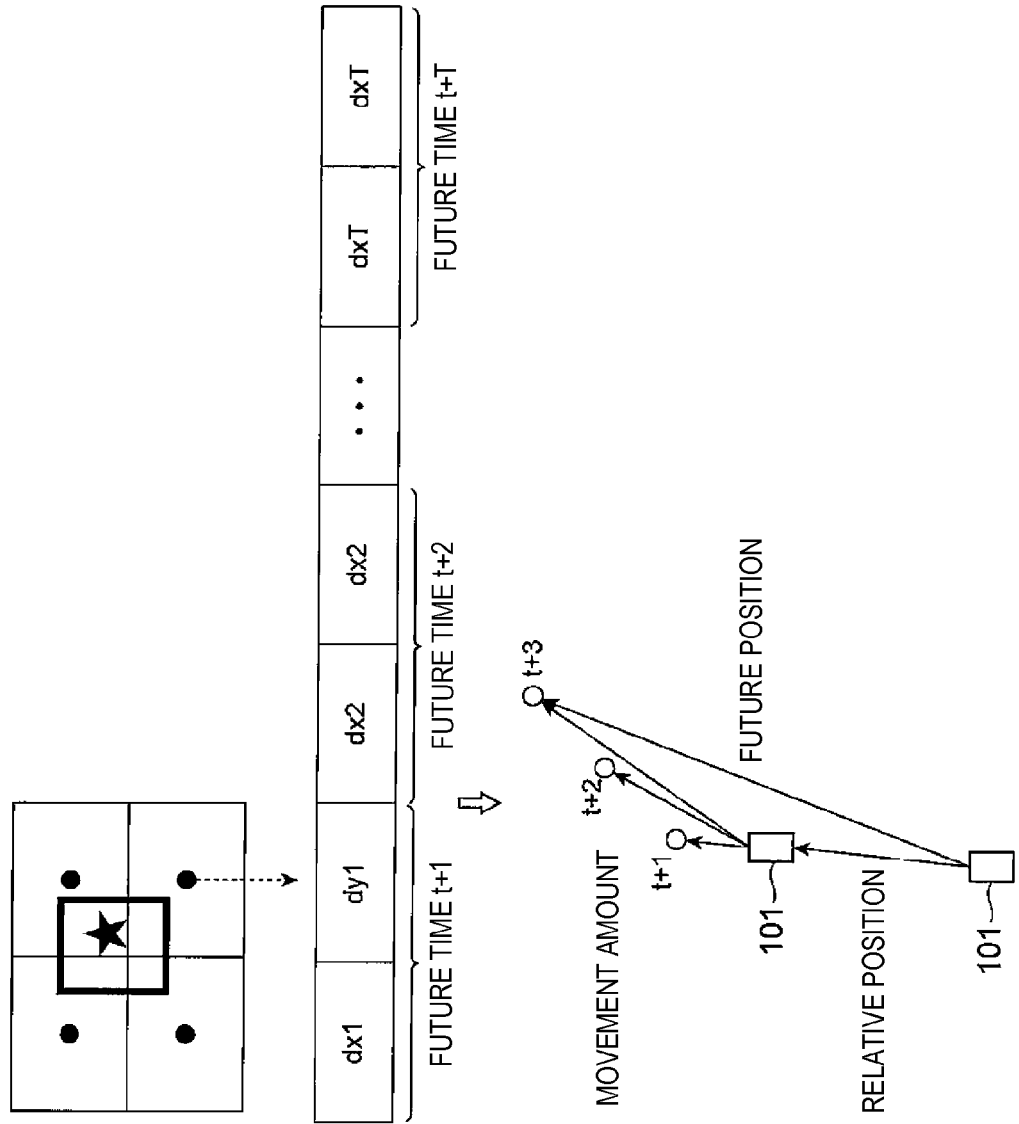
FIG. 15 is an explanatory diagram of a future position prediction process according to the first embodiment.

FIG. 15 is an explanatory diagram of the future position prediction process according to the first embodiment. The future position prediction unit 1006 predicts the future position of the moving object at a different future time based on the movement amount of the moving object from the current position. In this case, since the output of the movement amount acquisition unit 1005 is the movement amount from the current position at different future times, the prediction result of the future behavior of each moving object with respect to the own vehicle can be obtained by adding the relative position of each moving object with respect to the own vehicle to the movement amount for each future time.

Next, the learning process by the server and the future position prediction process of the moving object by the moving object behavior prediction device will be described.

Figure 16:
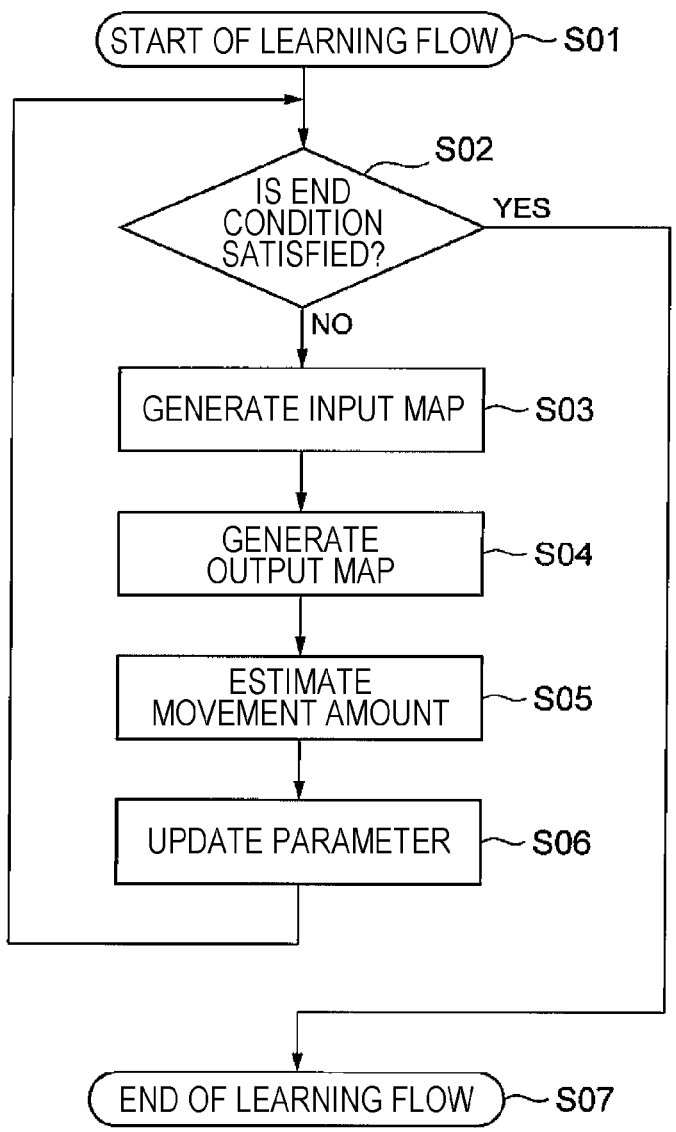
FIG. 16 is an example of a learning flow by the server of the first embodiment.

FIG. 16 is an example of the learning flow by the server of the first embodiment. The learning flow is executed at the timing when the learning flow is instructed by a system administrator or at the timing when the traveling data storage unit 701 updates a predetermined amount of traveling data or more. When the learning flow is started (Step S01), it is determined whether the end condition of learning is satisfied (Step S02). The end condition includes, for example, a condition for the number of parameter updates and a condition for the update amount.

If the parameter update process is repeated more than a specified number of times, or if the parameter update amount is less than a certain amount, it is determined that the end condition is satisfied (YES in Step S02), and the learning flow ends (Step S07).

If the end condition of learning is not satisfied (NO in Step S02), the input map generation unit 703 generates an input map (Step S03). The input map generation unit 703 generates an input map from the traveling data 702 at an arbitrary time stored in the traveling data storage unit 701. Next, the output map generation unit 704 generates an output map (Step S04).

The output map generation unit 704 generates an output map from the traveling data 702 at a future time after the arbitrary time stored in the traveling data storage unit 701. Next, the movement amount estimation unit 705 estimates the movement amount at each cell coordinate on the map from the input map (Step S05). The movement amount estimation unit 705 estimates the movement amount from the input map, using the convolutional neural network.

Next, the parameter update unit 706 updates the parameter of the convolutional neural network so that the error between the output of the movement amount estimation unit 705 and the output of the output map generation unit 704 becomes small (Step S06). Then, each process from Step S03 to Step S06 is repeated until the end condition of Step S02 is satisfied, and the optimum parameter for the convolutional neural network is set. The parameter after learning is notified from the server to the moving object behavior prediction device of the vehicle, and is used for constructing the convolutional neural network trained by the moving object behavior prediction device.

Figure 17:
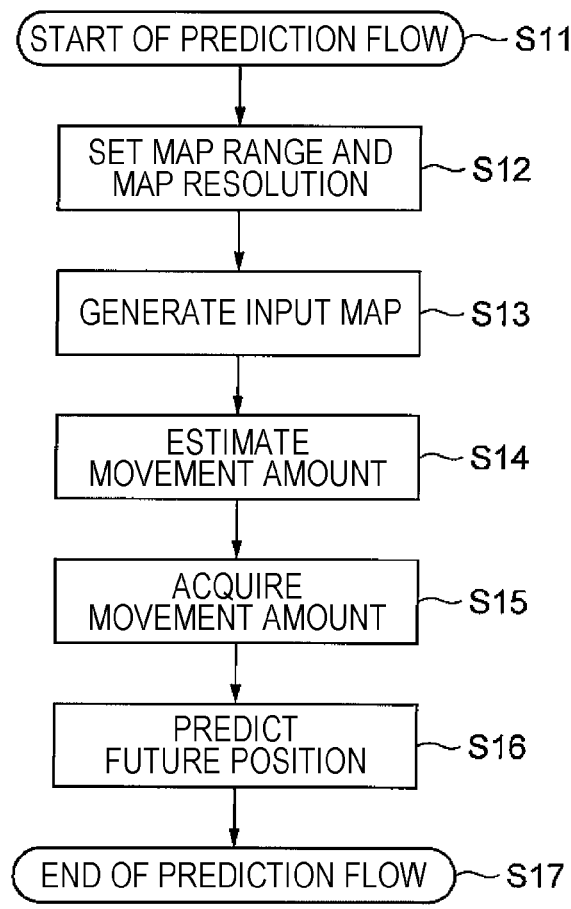
FIG. 17 is an example of a prediction flow by the moving object behavior prediction device of the first embodiment.

FIG. 17 is an example of the prediction flow by the moving object behavior prediction device of the first embodiment. When the prediction flow is started (Step S11), the map range of the input map is set by the map range setting unit 1007, and the map resolution of the input map is set by the map resolution setting unit 1008 (Step S12). The map range setting unit 1007 sets the map range of the input map according to the traveling environment information of the own vehicle and the speed information of the moving object. The map resolution setting unit 1008 sets the map resolution according to the number of moving objects per unit area of the input map. Next, the map generation unit 1009 generates an input map (Step S13).

Next, the movement amount estimation unit 1004 estimates the movement amount at each cell coordinate on the map from the input map (Step S14). The movement amount estimation unit 1004 estimates the movement amount from the input map, using the trained convolutional neural network to which the learning result made by the server is reflected. Next, the movement amount acquisition unit 1005 acquires the movement amount of the moving object from the current position (Step S15). The movement amount acquisition unit 1005 acquires the movement amount of the moving object at a predetermined coordinate, by bilinear interpolation, from the movement amount stored in the peripheral cell located around the moving object. Next, the future position prediction unit 1006 predicts the future position of the moving object (Step S16).

The future position prediction unit 1006 estimates the future position from the relative position and the movement amount of each moving object with respect to the own vehicle. In this way, the future behavior of each moving object is predicted and the prediction flow ends (Step S17).

As described above, the moving object behavior prediction device according to the first embodiment estimates the movement amounts of a plurality of moving objects on a single map. Therefore, since the related information of the static object of a single input map and the related information of the moving object are commonly used for the behavior prediction of all moving objects, the arithmetic processing required for each moving object is reduced and the increase in calculation amount as the number of moving objects to be predicted increases can be suppressed. Moreover, since the future behavior of each moving object can be predicted by using the information of a wide range map, the prediction accuracy can be improved.

Second Embodiment

Figure 18:
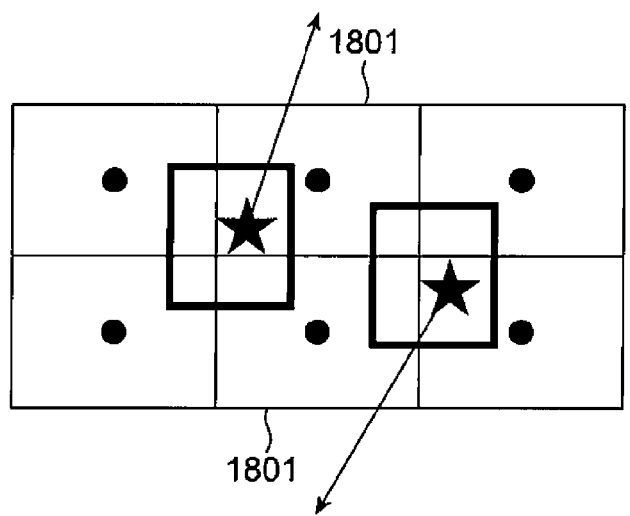
FIG. 18 is a diagram illustrating a prediction example when moving objects pass by each other.

In the first embodiment, the movement amount of each moving object is estimated using the input map. As described above, although the movement amount is obtained by bilinear interpolation of the movement amount of the peripheral cells of each moving object (see FIG. 14), the prediction accuracy may decrease when the moving objects pass by each other. FIG. 18 is a diagram illustrating a prediction example when moving objects pass by each other. The distance between the moving objects is narrow, and the peripheral cells of each moving object are partially common. Since only the movement amount used for the prediction of one moving object is stored in a common cell 1801, the prediction accuracy is lowered by using this movement amount for the prediction of the other moving object.

Therefore, in the second embodiment, the surrounding information regarding the topography and the interaction between the moving objects is estimated without estimating the movement amount by the map processing, and the information regarding the advancing direction of each moving object is combined to predict the future behavior. Hereinafter, the second embodiment of the invention will be described with reference to the drawings. The second embodiment is different from the first embodiment in that the surrounding information regarding the topography, the interaction between moving objects, and the like is estimated by map processing. Therefore, the description of the configuration similar to that of the first embodiment will be omitted as much as possible.

Figure 19:
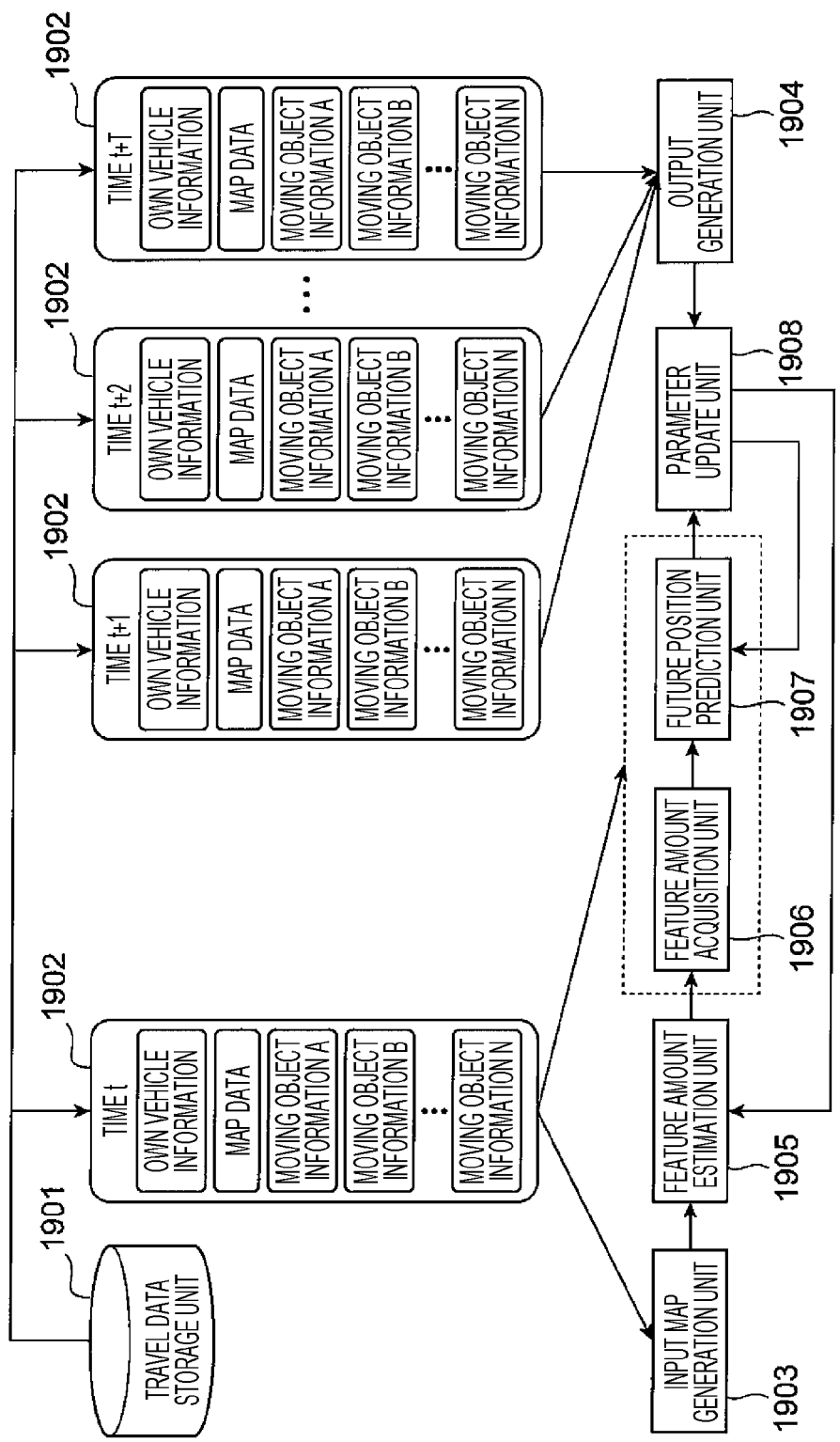
FIG. 19 is a functional block diagram of a server of a second embodiment.

FIG. 19 is a functional block diagram of the server of the second embodiment. The server is provided with a traveling data storage unit 1901, an input map generation unit 1903, an output generation unit 1904, a feature amount estimation unit 1905, a feature amount acquisition unit 1906, a future position prediction unit 1907, and a parameter update unit 1908. The traveling data storage unit 1901 stores traveling data 1902 at each time collected from each moving object. The input map generation unit 1903 reads the traveling data 1902 at an arbitrary time t from the traveling data storage unit 1901 and generates a single input map. The output generation unit 1904 reads the traveling data 1902, from the traveling data storage unit 1901, from the future time t+1 to the future time t+T after the arbitrary time t, and outputs the movement amount of each moving object at the future time. The output of the output generation unit 1904 is not a three-dimensional tensor as in the output map of the first embodiment, but a movement amount vector for the number of moving objects. This is the same as the movement amount vector stored in the cell where the moving object exists in the output map.

The feature amount estimation unit 1905 uses a convolutional neural network for feature amount estimation to extract a feature map from the input map and estimate the feature amount of each cell. The feature map contains surrounding information regarding the topography and interaction of the moving objects as feature amount. The feature amount acquisition unit 1906 acquires the value of the feature map of each moving object, by bilinear interpolation, from the feature amount of the peripheral cells of each moving object. The future position prediction unit 1907 uses a neural network for estimating the movement amount to predict the movement amount for each moving object from the value of the feature map, the speed information of each moving object, and the movement amount of the moving object at the past time. The parameter update unit 1908 updates the convolutional neural network for feature amount estimation and the neural network for movement amount estimation so that the error between the movement amount acquired by the future position prediction unit 1907 and the movement amount output by the output generation unit 1904 becomes small. The parameter update process is repeated until the end condition is satisfied, as in the first embodiment.

Figure 20:
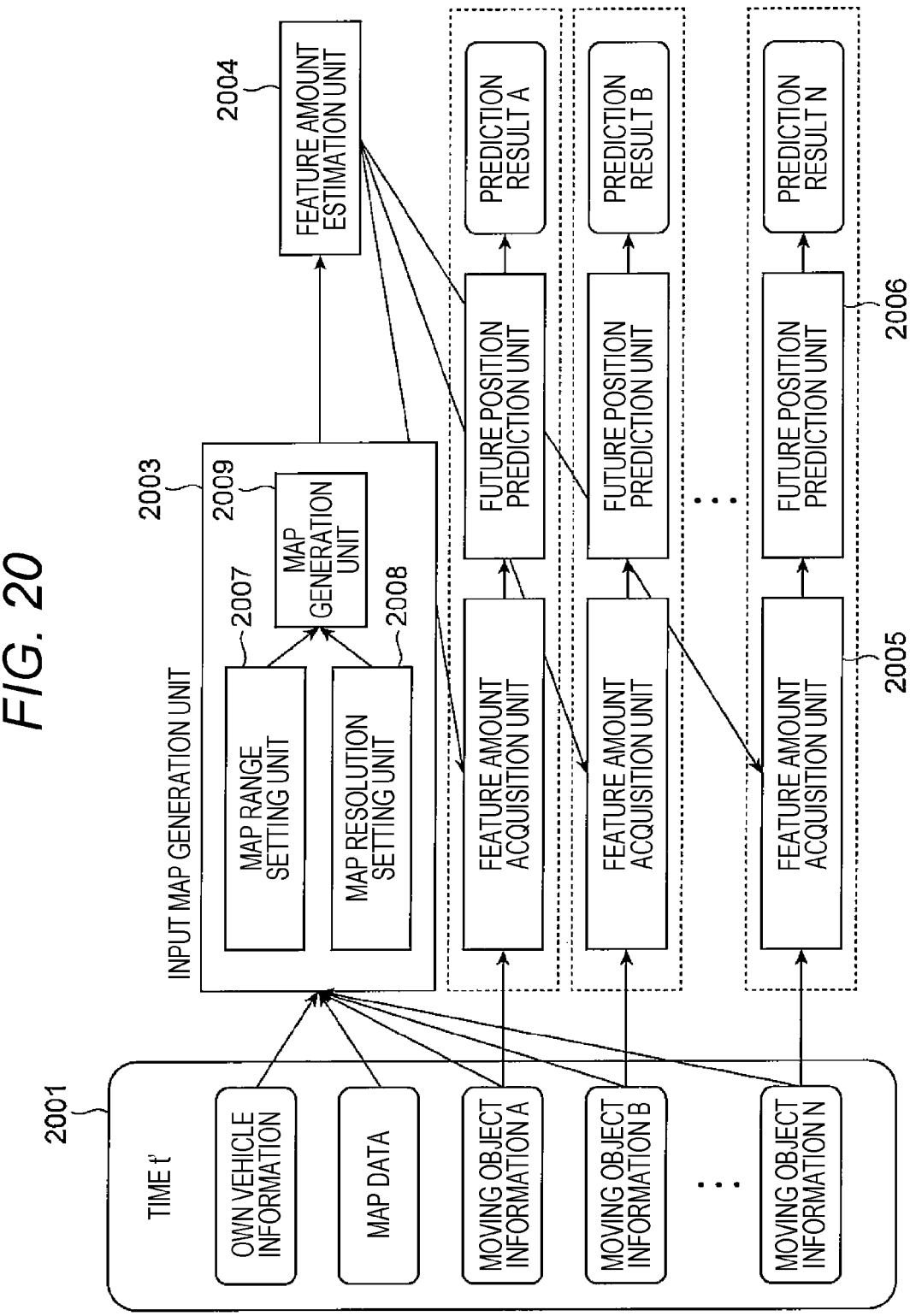
FIG. 20 is a functional block diagram of a moving object behavior prediction device of the second embodiment.

FIG. 20 is a functional block diagram of the moving object behavior prediction device of the second embodiment. The moving object behavior prediction device is provided with an input map generation unit 2003, a feature amount estimation unit 2004, a feature amount acquisition unit 2005 for each moving object, and a future position prediction unit 2006. The input map generation unit 2003 is provided with a map range setting unit 2007, a map resolution setting unit 2008, and a map generation unit 2009. The input map generation unit 2003 sets the map range in the map range setting unit 2007, and sets the map resolution in the map resolution setting unit 2008 to generate an input map.

The feature amount estimation unit 2004 extracts the feature map from the input map using the trained convolutional neural network to estimate the feature amount for each cell. The feature amount acquisition unit 2005 acquires the value of the feature map of each moving object, by bilinear interpolation, from the feature amount of the peripheral cells of each moving object. The future position prediction unit 2006 inputs the value of the feature map, the speed information of each moving object, and the movement amount of the moving object at the past time into the trained neural network to predict the movement amount of each moving object. Then, the future position prediction unit 2006 can obtain the prediction result of the future behavior of each moving object with respect to the own vehicle by adding the relative position of each moving object with respect to the own vehicle to the movement amount of each moving object.

As described above, in the moving object behavior prediction device according to the second embodiment, it is possible to suppress an increase in the calculation load and improve the prediction accuracy of each moving object as in the first embodiment. In addition, the arithmetic processing of the feature amount estimation unit 2004 is up to the recognition of the surrounding environment of each moving object. Therefore, even in a traffic situation where moving objects pass by each other, it is possible to predict with high accuracy by combining information on the surrounding environment with information on the movement amount of each moving object at the past time, that is, information on the advancing direction.

Third Embodiment

In the prediction method of the first embodiment (hereinafter, referred to as a first prediction method), the arithmetic processing becomes faster because the movement amount is predicted on the map, but the prediction accuracy decreases in the traffic situation where the moving objects pass by each other. On the other hand, the prediction method of the second embodiment (hereinafter, referred to as a second prediction method) avoids a decrease in prediction accuracy even in a traffic situation where the moving objects pass by each other, but the arithmetic processing for each moving object increases so as to increase the processing time. Therefore, in the third embodiment, the first and second prediction methods are used properly depending on whether the traffic conditions cause the moving objects to pass by each other.

Figure 21:
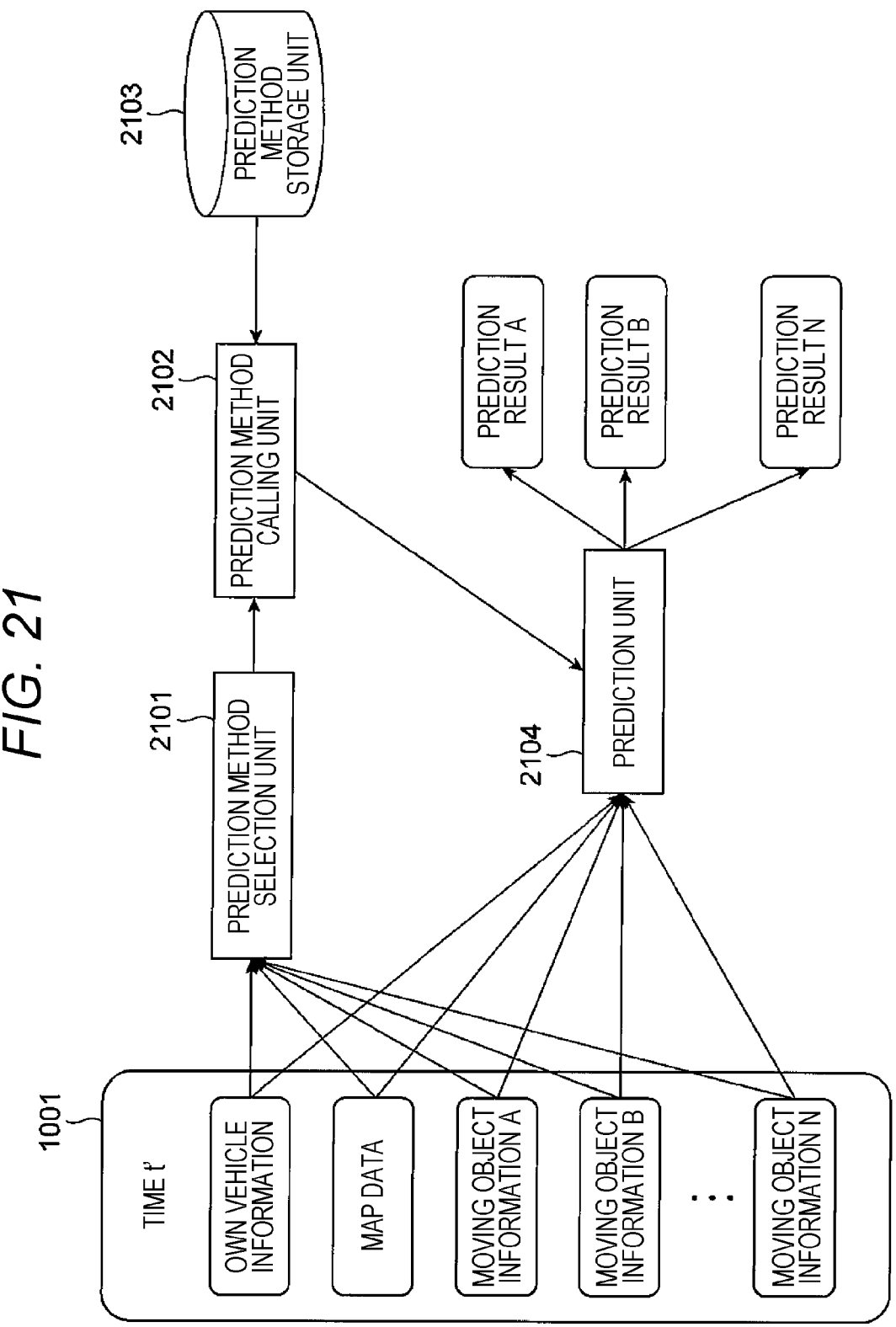
FIG. 21 is a functional block diagram of a moving object behavior prediction device of a third embodiment.

FIG. 21 is a functional block diagram of the moving object behavior prediction device of the third embodiment. The moving object behavior prediction device is provided with a prediction method selection unit 2101, a prediction method calling unit 2102, a prediction method storage unit 2103, and a prediction unit 2104. The prediction method selection unit 2101 selects which of the first and second prediction methods to use. The prediction method selection unit 2101 selects the first prediction method when the minimum value of the distances of the plurality of moving objects is equal to or greater than a threshold. When the minimum value of the distances of the plurality of moving objects is smaller than the threshold, the second prediction method is selected. The distance equal to or greater than the threshold is the distance at which the peripheral cells of the moving objects are not common, and the distance smaller than the threshold is the distance common to the peripheral cells of the moving objects.

The prediction method calling unit 2102 reads the prediction method selected by the prediction method selection unit 2101 from the prediction method storage unit 2103. The prediction unit 2104 predicts the future behavior of each moving object by the prediction method called from the prediction method storage unit 2103. In a traffic situation where the moving objects pass by each other, the second prediction method is called, the prediction accuracy is prioritized over the processing speed of arithmetic processing, and the deterioration of the prediction accuracy is suppressed. In a traffic situation where the moving objects do not pass by each other, the first prediction method is called, the processing speed of arithmetic processing is prioritized over the prediction accuracy, and the processing time is shortened. As described above, in the third embodiment, both the processing speed and the prediction accuracy are compatible.

Figure 22:
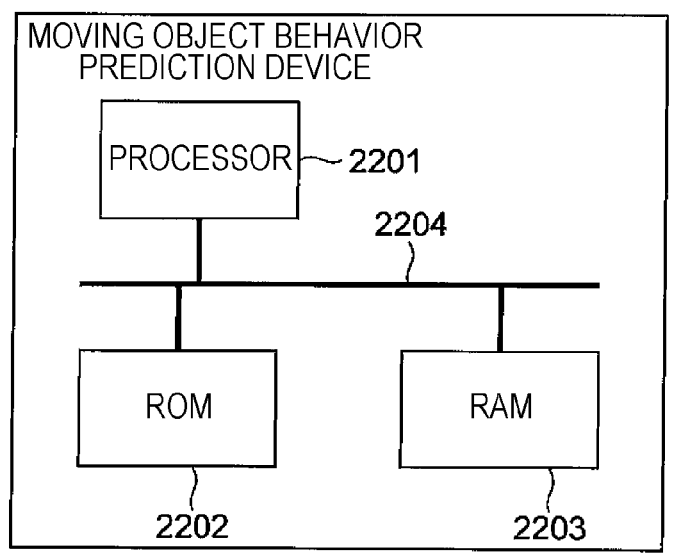
FIG. 22 is a block diagram illustrating a hardware configuration of the moving object behavior prediction device.

The hardware configuration of each moving object behavior prediction device described above will be described. FIG. 22 is a block diagram illustrating the hardware configuration of the moving object behavior prediction device of this embodiment. In the moving object behavior prediction device, a processor 2201 that performs various arithmetic processing according to a program, a ROM (Read Only Memory) 2202 that stores programs, etc., a RAM (Random Access Memory) 2203, etc. that has a work area used in various processing processes are built in, which are interconnected by a bus line 2204. In this way, the arithmetic processing of each part of the moving object behavior prediction device is executed by coordinating the processors 2201, the ROM 2202, and the RAM 2203. The server also has a hardware configuration similar to that of the moving object behavior prediction device, and the arithmetic processing of each part of the server is executed by coordinating the processor, the ROM, and the RAM.

In each of the above embodiments, the moving object behavior prediction device is configured to predict the future position of the moving object at different times, but the future position of the moving object at a single time may be predicted. Although the moving object behavior prediction device is configured to predict the future positions of a plurality of moving objects, the future position of a single moving object may be predicted.

Hitherto, the embodiments of the invention have been described, but the invention is not limited to the embodiments. Various modifications may be made within a scope not departing from the spirit of the invention disclosed in claims. For example, the above-described embodiments of the invention have been described in detail in a clearly understandable way, and are not necessarily limited to those having all the described configurations. In addition, some of the configurations of a certain embodiment may be replaced with the configurations of the other embodiments, and the configurations of the other embodiments may be added to the configurations of the subject embodiment. In addition, some of the configurations of each embodiment may be omitted, replaced with other configurations, and added to other configurations.

REFERENCE SIGNS LIST

10 server
20 moving object behavior prediction device
30 vehicle
1003 input map generation unit
1004 movement amount estimation unit (feature amount estimation unit)
1005 movement amount acquisition unit (feature amount acquisition unit)
1006 future position prediction unit
1007 map range setting unit
1008 map resolution setting unit
2003 input map generation unit
2004 feature amount estimation unit
2005 feature amount acquisition unit
2006 future position prediction unit
2007 map range setting unit
2008 map resolution setting unit 2101 prediction method selection unit
2103 prediction method storage unit

The invention claimed is:

1. A moving object behavior prediction device for predicting a behavior of a moving object around an own vehicle, comprising:
an input map generation unit that generates a single input map in which a region capable of containing a plurality of the moving objects is divided into a plurality of cells, each of the plurality of cells storing related information of a static object and related information of each of the plurality of moving objects;
a feature amount estimation unit that estimates a feature amount of each of the plurality of cells from the input map, using a trained convolutional neural network;
a feature amount acquisition unit that determines a feature amount at a current position for each of the plurality of moving objects based on
a coordinate that is deviated from a center coordinate of each of a periphery of cells located around the moving object in the input map,
extracting the periphery of cells to create a movement amount map,
determining, using the movement amount map, a future time when the moving object is present at the center coordinate of each of the periphery of cells,
determining a movement amount between the coordinate and the center coordinate, and
determining the feature amount at the future time based on a positional relationship between the current position on the input map and the movement amount; and
a future position prediction unit that predicts a future position for each of the plurality of moving objects based on the determined feature amount at the future time and a relative position of the moving object relative to the own vehicle.

2. The moving object behavior prediction device according to claim 1, wherein the feature amount estimation unit estimates the movement amount as the feature amount for each of the plurality of cells.

3. The moving object behavior prediction device according to claim 1, wherein the feature amount estimation unit estimates surrounding information as the feature amount for each of the plurality of cells.

4. The moving object behavior prediction device according to claim 1, wherein the feature amount acquisition unit acquires the movement amount for each of the plurality of moving objects existing in the input map at a different future time.

5. The moving object behavior prediction device according to claim 1, wherein the feature amount acquisition unit acquires, for each of the plurality of moving objects, the feature amount at the coordinate in which the moving object exists, by using bilinear interpolation, from a feature amount stored in a cell located around the moving object.

6. The moving object behavior prediction device according to claim 1, wherein, for each of the plurality of moving objects, the input map generation unit stores information of the moving object at a current time and information of the moving object at a past time, as related information of the moving object, in a cell to generate the input map.

7. The moving object behavior prediction device according to claim 1, wherein the input map generation unit includes a map range setting unit that sets a map range of the input map according to traveling environment information of the own vehicle and speed information of each of the plurality of moving objects.

8. The moving object behavior prediction device according to claim 1, wherein the input map generation unit includes a map resolution setting unit that sets a map resolution according to the number of the plurality of moving objects per unit area of the input map.

9. The moving object behavior prediction device according to claim 1, further comprising:
a prediction method storage unit that stores a first prediction method that uses a movement amount as a feature amount and a second prediction method that uses surrounding information as a feature amount; and
a prediction method selection unit that selects between the first prediction method and the second prediction method based on distances of a plurality of moving objects,
wherein the prediction method selection unit selects the first prediction method when a minimum value of the distances of the plurality of moving objects is equal to or greater than a threshold or the second prediction method when the minimum value of the distances of the plurality of moving objects is smaller than the threshold.

10. The moving object behavior prediction device according to claim 1, wherein
the convolutional neural network has been trained in an external server, and
the server generates the input map at an arbitrary time, sets a movement amount of a moving object, which has been observed at an arbitrary time, until a future time as a target output, and updates a parameter of the convolutional neural network such that an error between a movement amount at a future time estimated from the input map by the convolutional neural network and the target output becomes small.

11. The moving object behavior prediction device according to claim 1, wherein each of the plurality of moving objects has at least two different future times when the moving object is present at the center coordinate.

12. The moving object behavior prediction device according to claim 11, wherein on a condition that each of the plurality of moving objects has at least the two different future times, the future position prediction unit determines the future position by adding a relative position of each of the plurality of moving objects with respect to the own vehicle to the feature amount for each of the at least two different future times.

* * * * *